United States Patent
Lim et al.

(10) Patent No.: US 8,638,732 B2
(45) Date of Patent: Jan. 28, 2014

(54) APPARATUS AND METHOD FOR ALLOCATING RESOURCES USING CODEBOOK IN A BROADBAND WIRELESS COMMUNICATION SYSTEM

(75) Inventors: Jun-Sung Lim, Seoul (KR); Ho-Kyu Choi, Seongnam-si (KR); Taori Rakesh, Suwon-si (KR); Jae-Weon Cho, Seongnam-si (KR); Se-Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 12/683,703

(22) Filed: Jan. 7, 2010

(65) Prior Publication Data
US 2010/0172314 A1 Jul. 8, 2010

(30) Foreign Application Priority Data

Jan. 7, 2009  (KR) .................. 10-2009-0001041
Mar. 20, 2009 (KR) .................. 10-2009-0024145
Apr. 20, 2009 (KR) .................. 10-2009-0034296

(51) Int. Cl.
| H04W 4/00 | (2009.01) |
| H04L 12/16 | (2006.01) |
| H04J 3/00 | (2006.01) |
| H04J 3/14 | (2006.01) |
| H04L 27/28 | (2006.01) |
| H04L 5/12 | (2006.01) |

(52) U.S. Cl.
USPC ........... 370/329; 370/232; 370/260; 370/328; 370/336; 375/260; 375/261; 375/262; 375/263

(58) Field of Classification Search
USPC .......... 370/204, 215, 232–329, 336; 375/263, 375/260–262
See application file for complete search history.

(56) References Cited

U.S. PATENT DOCUMENTS

| 2004/0184417 | A1* | 9/2004 | Chen et al. ............. 370/328 |
| 2007/0140167 | A1* | 6/2007 | Jang et al. ............. 370/329 |
| 2008/0095071 | A1* | 4/2008 | Lu et al. ............... 370/254 |
| 2008/0107193 | A1* | 5/2008 | Erceg et al. ........... 375/260 |
| 2008/0165688 | A1* | 7/2008 | Beshai et al. .......... 370/232 |
| 2008/0205533 | A1* | 8/2008 | Lee et al. .............. 375/260 |
| 2008/0219373 | A1* | 9/2008 | Zhang et al. ........... 375/262 |
| 2009/0086686 | A1* | 4/2009 | Rudolf et al. .......... 370/336 |

FOREIGN PATENT DOCUMENTS

CN 101208887 A 6/2008

OTHER PUBLICATIONS

McBeath et al., VoIP Support Using Group Resource Allocation Based on the UMB System, IEEE Communications Magazine, Jan. 31, 2008, IEEE.

* cited by examiner

*Primary Examiner* — Jung Park
*Assistant Examiner* — Chuong M Nguyen
(74) *Attorney, Agent, or Firm* — Jefferson IP Law, LLP

(57) ABSTRACT

A method and an apparatus for allocating a resource in a broadband wireless communication system are provided. In the method, a Modulation and Coding Scheme (MCS) level set and a burst size set to generate a codebook is determined. The codebook is generated using the MCS level set and the burst size set. Resource allocation information is one of generated and read according to the codebook.

20 Claims, 16 Drawing Sheets

APPARATUS AND METHOD FOR ALLOCATING RESOURCES USING CODEBOOK IN A BROADBAND WIRELESS COMMUNICATION SYSTEM

PRIORITY

This application claims the benefit under 35 U.S.C. §119 (a) of a Korean patent application filed in the Korean Intellectual Property Office on Jan. 7, 2009 and assigned Serial No. 10-2009-0001041, a Korean patent application filed in the Korean Intellectual Property Office on Mar. 20, 2009 and assigned Serial No. 10-2009-0024145 and a Korean patent application filed in the Korean Intellectual Property Office on Apr. 20, 2009 and assigned Serial No. 10-2009-0034296, the disclosures of each of which are hereby incorporated by reference.

BACKGROUND OF THE INVENTION

1. Field of the Invention

The present invention relates to a broadband wireless communication system. More particularly, the present invention relates to an apparatus and a method for allocating resources using a codebook in a broadband wireless communication system.

2. Description of the Related Art

In a 4th Generation (4G) communication system, which is a next generation communication system, research for providing services having various Quality of Service (QoS) using a transmission speed of about 100 M bps to a user is being conducted. A representative communication system is an Institute of Electrical and Electronics Engineers (IEEE) 802.16 system. The IEEE 802.16 system applies an Orthogonal Frequency Division Multiplexing (OFDM)/Orthogonal Frequency Division Multiple Access (OFDMA) scheme in order to support a broadband transmission network in a physical channel.

In a broadband wireless communication system such as the IEEE 802.16 system, a base station allocates a resource to a terminal in order to transmit/receive data. In addition, a base station transmits a MAP representing resource allocation results such as a location, a size, a modulation scheme, an encoding rate, etc. of an allocated resource to a terminal via a downlink channel. Moreover, when a Multiple Input Multiple Output (MIMO) technique is applied, MIMO configuration information representing which MIMO technique is applied is additionally added to the MAP. Generally, a MAP representing resource allocation results for uplink communication, and a MAP representing resource allocation results for downlink communication are separately configured, and a unit of information used for allocating one resource is called an Information Element (IE).

For performing communication, transmission of the MAP is essential. However, the MAP competitively occupies a wireless resource with data. Therefore, when consumption of wireless resources due to transmission of the MAP is large, an amount of wireless resources available for data transmission reduces. Therefore, the MAP should be designed such that the MAP may transfer all information used for resource allocation, and simultaneously, have a minimum capacity. That is, an alternative for minimizing an overhead due to the MAP needs to be proposed.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing an overhead due to resource allocation information in a broadband wireless communication system.

Another aspect of the present invention is to provide an apparatus and a method for generating and reading resource allocation information for a limited range of Modulation and Coding Scheme (MCS) levels and resource sizes in a broadband wireless communication system.

Still another aspect of the present invention is to provide an apparatus and a method for generating and reading resource allocation information using a codebook in a broadband wireless communication system.

Yet another aspect of the present invention is to provide an apparatus and a method for generating and reading resource allocation information according to a Group Resource Allocation (GRA) scheme using a codebook in a broadband wireless communication system.

In accordance with an aspect of the present invention, a method for operating a wireless node in a broadband wireless communication system is provided. The method includes determining a Modulation and Coding Scheme (MCS) level set and a burst size set to generate a codebook, generating the codebook using the MCS level set and the burst size set, and generating or reading resource allocation information according to the codebook.

In accordance with another aspect of the present invention, an apparatus for operating a wireless node in a broadband wireless communication system is provided. The apparatus includes a controller for determining a Modulation and Coding Scheme (MCS) level set and a burst size set to generate a codebook, and for generating the codebook using the MCS level set and the burst size set, and a message processor for generating or reading resource allocation information according to the codebook.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for reducing an overhead due to resource allocation information in a broadband wireless communication system. The present invention is described using an OFDM/OFDMA wireless communication system as an example, but is readily applicable to a wireless communication system of a different scheme.

Figure 1:
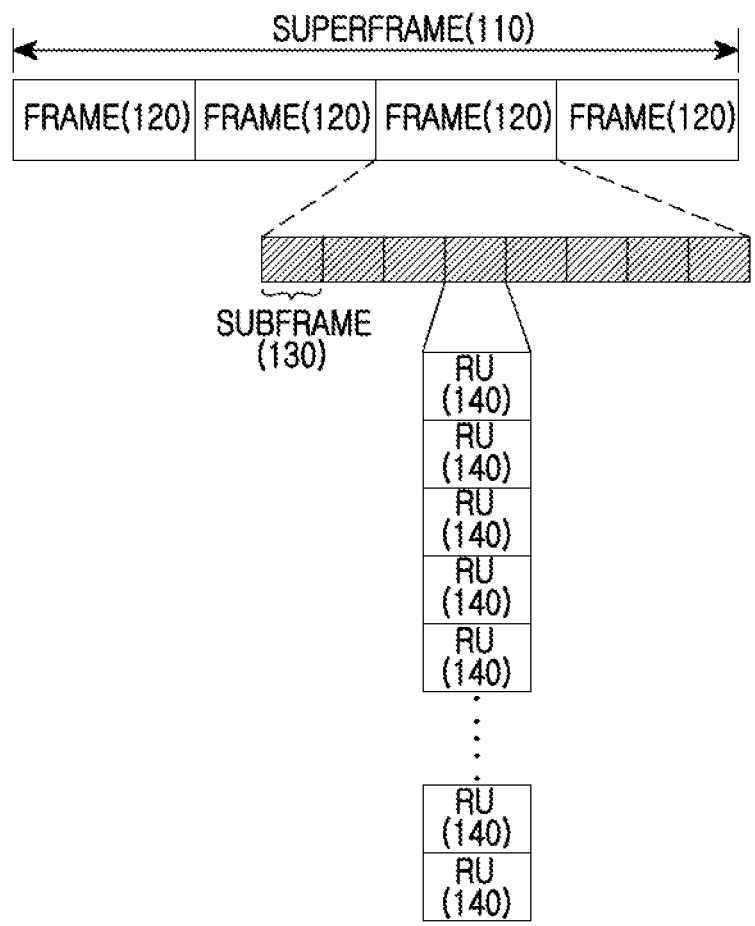
FIG. 1 is a diagram illustrating a frame structure of a broadband wireless communication system according to an exemplary embodiment of the present invention.

FIG. 1 is a diagram illustrating a frame structure of a broadband wireless communication system according to an exemplary embodiment of the present invention.

Referring to FIG. 1, one superframe 110 includes a plurality of frames 120. In addition, each frame 120 includes a plurality of subframes 130. Each subframe 130 includes a plurality of OFDMA symbols 140. Resource allocation is performed on a resource inside each subframe 130, and a resource inside each subframe 130 is allocated on a Resource Unit (RU) basis. That is, a terminal performing communication with a base station is allocated an RU on an integer basis.

Therefore, a MAP message is transmitted for each subframe 130. At this point, each of MAP IEs representing each resource allocation result included in the MAP message passes through at least one of Cyclic Redundancy Check (CRC) and scrambling using a unique sequence allocated to a terminal. Accordingly, each terminal identifies a MAP IE for the terminal by performing at least one of a CRC test and descrambling on each IE in a unique sequence allocated to the terminal The above-described MAP IE encoding scheme is referred to as separate coding.

A broadband wireless communication system according to an exemplary embodiment of the present invention limits a size of a transmission packet and a type of an MCS level in order to reduce a size of resource allocation information. In doing so, the number of available resource sizes is determined depending on what MCS level is used. Accordingly, a base station and a terminal generate a codebook indicating a limited range of MCS levels and resource sizes, and the base station generates resource allocation information representing an allocated MCS level and resource size based on the codebook.

For this purpose, the base station and the terminal perform a negotiation procedure for generating the codebook before performing data communication. In other words, one of the base station and the terminal determines MCS level candidates and packet size candidates, informs of the determined MCS level candidates and packet size candidates. The other of the base station and the terminal performs a procedure for accepting the determination of the counterpart. When it is determined that a completed negotiation procedure is not proper, the base station and the terminal can change the MCS level candidates and the packet size candidates by re-performing the negotiation procedure. For the negotiation procedure, the base station and the terminal transmit/receive at least one of a negotiation indicate message and a negotiation confirm message. Here, the packet size candidates include a plurality of discrete packet sizes, or include packet sizes within a specific range expressed in a minimum value and a maximum value.

After performing the negotiation procedure, the base station and the terminal generate a codebook according to MCS level candidates and packet size candidates determined through the negotiation procedure. First, the base station and the terminal calculate a resource size depending on the determined MCS level candidates and packet size candidates. At this point, a unit of the resource size is referred to as a Resource Unit (RU). The RU is a minimum resource allocation unit, and includes the number of tones defined by a system. For example, the RU includes 96 tones. For example, assuming that packet size candidates are 16 bytes to 42 bytes, and MCS level candidates are Quadrature Phase Shift Keying (QPSK) ¼ and QPSK ½, corresponding resource sizes are given as shown in Table 1. In Table 1, the resource sizes are expressed in terms of the number of RUs.

TABLE 1

| Packet size | Resource size (QPSK¼) | Resource size (QPSK½) |
|---|---|---|
| 42 | 7 | 4 |
| 41 | 7 | 4 |
| 40 | 7 | 4 |
| 39 | 7 | 4 |
| 38 | 7 | 4 |
| 37 | 7 | 4 |
| 36 | 6 | 3 |
| 35 | 6 | 3 |
| 34 | 6 | 3 |
| 33 | 6 | 3 |
| 32 | 6 | 3 |
| 31 | 6 | 3 |
| 30 | 5 | 3 |
| 29 | 5 | 3 |
| 28 | 5 | 3 |
| 27 | 5 | 3 |
| 26 | 5 | 3 |
| 25 | 5 | 3 |
| 24 | 4 | 2 |
| 23 | 4 | 2 |
| 22 | 4 | 2 |
| 21 | 4 | 2 |
| 20 | 4 | 2 |
| 19 | 4 | 2 |
| 18 | 3 | 2 |
| 17 | 3 | 2 |
| 16 | 3 | 2 |

As shown in Table 1, after calculating resource sizes for each combination of an MCS level and a packet size, the base station and the terminal assign codes to combinations of MCS levels and resource sizes according to a predefined rule. For example, the codes are sequentially assigned according to aligned MCS levels and aligned resource sizes. In this case, the codes are assigned as in Table 2.

TABLE 2

| MCS level | Resource size | code |
|---|---|---|
| QPSK¼ | 7 | 000 |
| QPSK¼ | 6 | 001 |
| QPSK¼ | 5 | 010 |
| QPSK¼ | 4 | 011 |
| QPSK¼ | 3 | 100 |
| QPSK½ | 4 | 101 |
| QPSK½ | 3 | 110 |
| QPSK½ | 2 | 111 |

A base station that uses a codebook illustrated in Table 2 allocates resources with consideration of only negotiated MCS levels and packet sizes, selects one of combinations of MCS levels and resource sizes inside the codebook, and transmits a code corresponding to the selected combination as resource allocation information to a terminal. Therefore, the terminal determines a resource allocated to the terminal by searching for the combination of the MCS level and resource size corresponding to the code.

In generating the codebook, a length of a code is calculated as follows. First, the number of bits transmittable via one RU is calculated using Equation (1).

$$D\_bit\_RU(i) = N\_sub\_RU \times B(i) \quad (1)$$

Wherein, $D\_bit\_RU(i)$ is the number of data bits when an i-th MCS level is applied, $N\_sub\_RU$ is the number of subcarriers per RU, and $B(i)$ is the number of data bits transmittable per subcarrier when an i-th MCS level is applied.

The number of resource sizes that can be allocated for each MCS level is calculated using Equation (2) using the number of data bits transmittable per RU calculated using Equation (1).

$$N\_RU\_req(i) = Ceil[P\_long/D\_bit\_RU(i)] - Ceil[P\_short/D\_bit\_RU(i)] + 1 \quad (2)$$

Wherein, $N\_RU\_req(i)$ is the number of resource sizes that can be allocated when an i-th MCS level is applied, Ceil[ ] is a raising operator, $P\_long$ is a maximum packet size, $P\_short$ is a minimum packet size, and $D\_bit\_RU(i)$ is the number of data bits when an i-th MCS level is applied.

The number of codes included in a codebook is calculated using Equation (3) using the number of resource sizes that can be allocated per each MCS level calculated using Equation (2).

$$N\_code = Sum(N\_RU\_req(i)) \quad (3)$$

Wherein, $N\_code$ is the number of codes included in the codebook, Sum( ) is a summing operator, and $N\_RU\_req(i)$ is the number of resource sizes that can be allocated when an i-th MCS level is applied.

Therefore, the number of bits of codes in the codebook is calculated using Equation (4).

$$Bit\_size\_ = Ceil[\log 2(N\_)] \quad (4)$$

Wherein, Bit_size is a length of a code, Ceil[ ] is a raising operator, and N_ is the number of codes included in the codebook.

Operations of a base station and a terminal transmitting/receiving resource allocation information using the codebook are described below with reference to FIG. 2.

Figure 2:
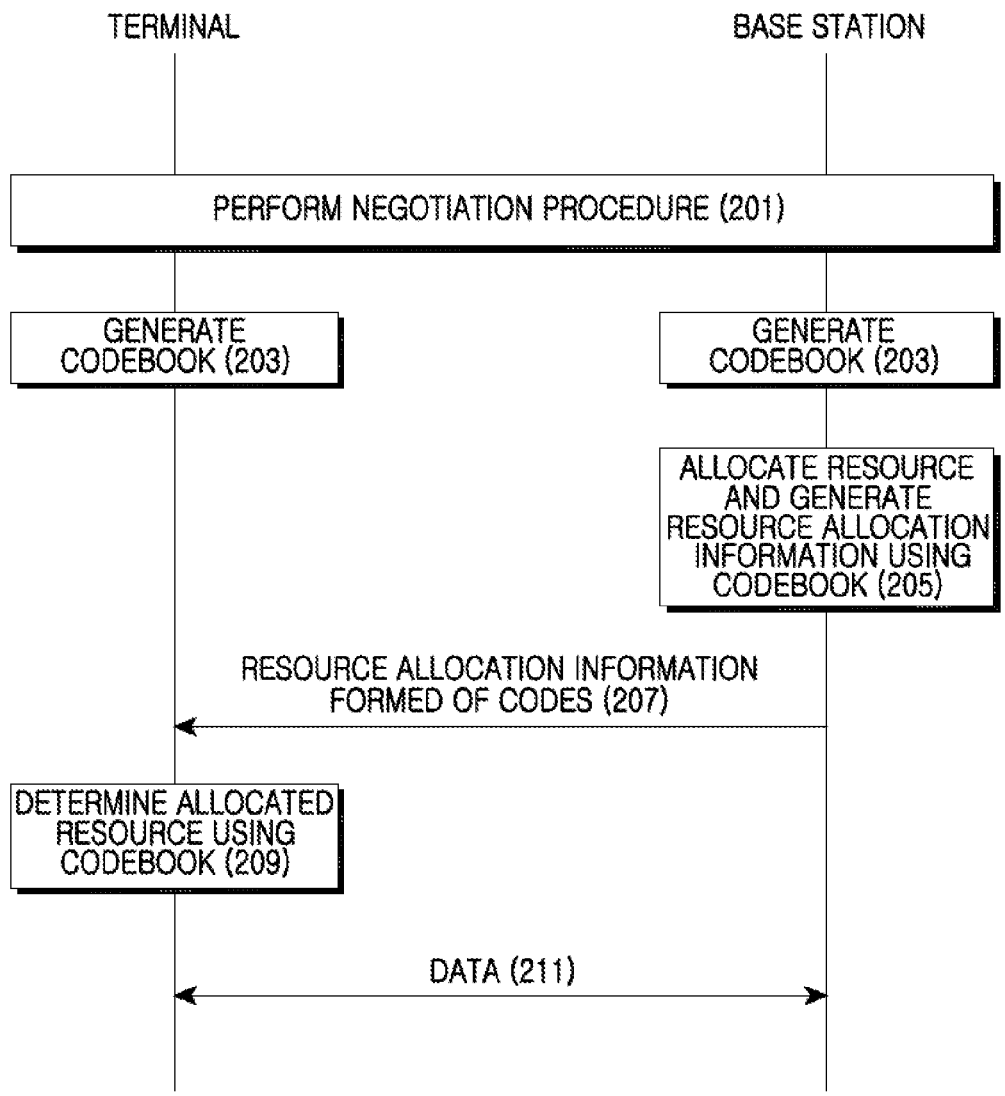
FIG. 2 is a diagram illustrating operations of a terminal and a base station using an individual resource allocation scheme in a broadband wireless communication system according to an exemplary embodiment of the present invention.

Referring to FIG. 2, the terminal and the base station perform a negotiation procedure via signaling in step 201. At this point, the terminal and the base station transmit/receive at least one of a negotiation indicate message and a negotiate confirm message. For example, the terminal transmits a negotiate indicate message in order to inform desired MCS level candidates and packet size candidates, and the base station transmits a negotiate confirm message in response to the negotiate indicate message. At this point, when the negotiate confirm message is not received, the terminal re-transmits a negotiate indicate message. Alternatively, the base station transmits a negotiate indicate message in order to inform desired MCS level candidates and packet size candidates, and the terminal transmits a negotiate confirm message in response to the negotiate indicate message. At this point, when the negotiate confirm message is not received, the base station re-transmits a negotiate indicate message. The transmission/reception of the negotiation confirm message may be omitted depending on the intention of an operator of the exemplary embodiment of the present invention.

The terminal and the base station generate a codebook according to the MCS level candidates and packet size candidates determined via the negotiation procedure in step 203.

At this point, the terminal and the base station generate a codebook according to a predefined rule, and therefore, the terminal and the base station possess the same codebook. In more detail, after calculating resource sizes for each MCS level, the terminal and the base station calculate variables used for generating the codebook using Equations (1) to (4), and assign codes to combinations of MCS levels and resource sizes. After generating the codebook, the base station allocates a resource to the terminal in order to perform data communication. In addition, the base station generates resource allocation information using the codebook in step 205. That is, the base station generates resource allocation information including a code of the codebook. The base station that has generated the resource allocation information transmits the resource allocation information including the code to the terminal in step 207. Accordingly, the terminal determines the resource allocated to the terminal using the codebook in step 209, and transmits/receives data to/from the base station via the allocated resource in step 211.

In FIG. 2, the base station and the terminal directly generate the codebook. However, according to an exemplary embodiment of the present invention, the base station and the terminal may use one of codebooks defined in advance. In this case, the base station and the terminal generate a codebook for generating and reading resource allocation information by selecting one codebook corresponding to the MCS level candidates and packet size candidates determined via the negotiation procedure of step 201 from a plurality of stored codebooks, and loading the selected codebook. However, when one codebook corresponding to the MCS level candidates and packet size candidates determined via the negotiation procedure does not exist among the plurality of stored code books, the base station and the terminal generate a codebook.

The codebook-based resource allocation information can be used for a Group Resource Allocation (GRA) scheme as well as a general individual resource allocation scheme. The GRA scheme is a technique for reducing an overhead of resource allocation information by binding a plurality of terminals in one group, and replacing identification information indicating respective terminals by a bitmap. That is, when the GRA is applied, a base station indicates whether to allocate a resource to each terminal included in a group through a bitmap, and transmits resource allocation information only for at least one terminal that has been allocated a resource. Therefore, when the GRA is applied, the base station should inform terminals included in the group of locations of bits corresponding to the respective terminals. In other words, the base station should inform the terminals which bit of bits inside the bitmap corresponds to each of the terminals.

Figure 3:
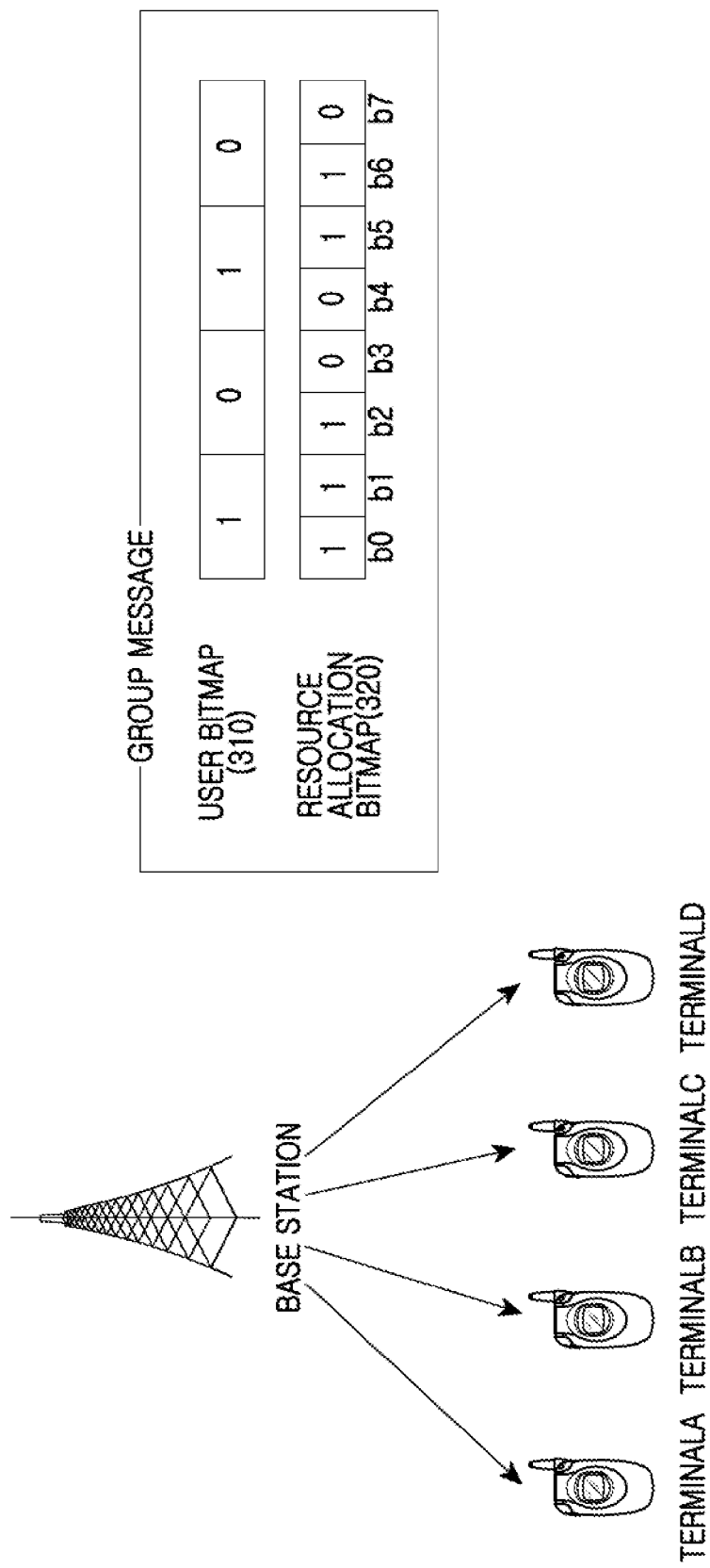
FIG. 3 is a diagram illustrating a group message configuration in a broadband wireless communication system according to an exemplary embodiment of the present invention.

FIG. 3 is a diagram illustrating a group message configuration in a broadband wireless communication system according to an exemplary embodiment of the present invention. For convenience in description, a message including resource allocation information according to the GRA scheme is referred to as a 'group message'.

Referring to FIG. 3, a user bitmap 310 indicates a terminal that is allocated a resource, and a resource allocation bitmap 320 expresses an MCS level and a resource size of an allocated resource. However, unlike the illustration of FIG. 3, the user bitmap 310 may be omitted, and one bitmap simultaneously representing whether a resource is allocated, an MCS level and a resource size may be used.

Referring to a group message illustrated in FIG. 3, a first bit of the user bitmap 310 corresponds to a terminal A, a second bit corresponds to a terminal B, a third bit corresponds to a terminal C, and a fourth bit corresponds to a terminal D. Since the first bit and the third bit of the user bitmap 310 are set to '1', the terminal A and the terminal C that have received the group message recognize that resources have been allocated to themselves, and the terminal B and the terminal D recognize that resources have not been allocated to themselves. Accordingly, the terminal A and the terminal C determine MCS levels and resource sizes allocated to themselves via the resource allocation bitmap 320. At this point, the resource allocation bitmap 320 is based on a codebook. That is, a group to which the terminal A to the terminal D belong supports only a limited number of MCS levels, and only a limited number of resource sizes, and uses a codebook indicating a limited range of MCS level candidates and packet size candidates. Therefore, the resource allocation bitmap 320 has a form where codes included in the codebook are connected.

That is, the base station determines supportable MCS level candidates and packet size candidates of the group, and generates the codebook according to the determined MCS level candidates and packet size candidates. After that, when a terminal suitable for a supportable range of the group occurs, the base station allows the terminal to join the group, and informs the supportable MCS level candidates and packet size candidates of the group. Accordingly, the terminal generates the same codebook as the base station. In FIG. 3, a length of the code is assumed to be 4. Therefore, the terminal A determines whether b0 to b3 of the resource allocation bitmap 320 are codes for the terminal A, and determines an MCS level and a resource size of a resource allocated to the terminal A via b0 to b3. Therefore, the terminal A uses a number of RUs, as many as the resource sizes from a resource start point of the group, as resources allocated to the terminal A. In addition, the terminal C determines whether b4 to b7 of the resource allocation bitmap 320 are codes for the terminal C, and determines an MCS level and a resource size of a resource allocated to the terminal C via b4 to b7. Therefore, the terminal C uses a number of RUs, as many as the resource sizes from the next resource unit of RUs allocated to the terminal A, as resources allocated to the terminal C.

To use the codebook-based resource allocation information for the GRA scheme, the base station should inform supportable MCS level candidates and packet size candidates of the group. At this point, to inform a terminal of supportable MCS level candidates and packet size candidates of the group, one of the following methods may be used.

First, a base station directly informs supportable MCS level candidates and packet size candidates via a group message. Here, the supportable MCS level candidates and packet size candidates are always included in the group message, or included in the group when a new terminal joins the group.

Second, a base station defines MCS sets representing various MCS level candidates in advance, and packet range types representing various packet size candidates, and incorporates an MCS set indicator and a packet range type indicator into the group message. For example, the MCS set is defined in the form that lists specific MCS level candidates, and the packet range type is defined as a minimum packet size and range. Here, information of the MCS sets and the packet range types defined in advance is transmitted using a separate broadcasting message. For example, the broadcasting message may be a message transmitted via Broadcast CHannel (BCH) such as DownLink Channel Descriptor (DCD)/Uplink Channel Descriptor (UCD), a superframe header, etc. Here, the MCS set indicator and the packet range type indicator are always included in a group message, or included when a new terminal joins the group.

Third, a system designer fixes supportable MCS level candidates and packet size candidates of a group. In this case, even when the base station does not separately inform a terminal of the supportable MCS level candidates and packet size candidates of the group, the terminal can generate a codebook.

Figure 4:
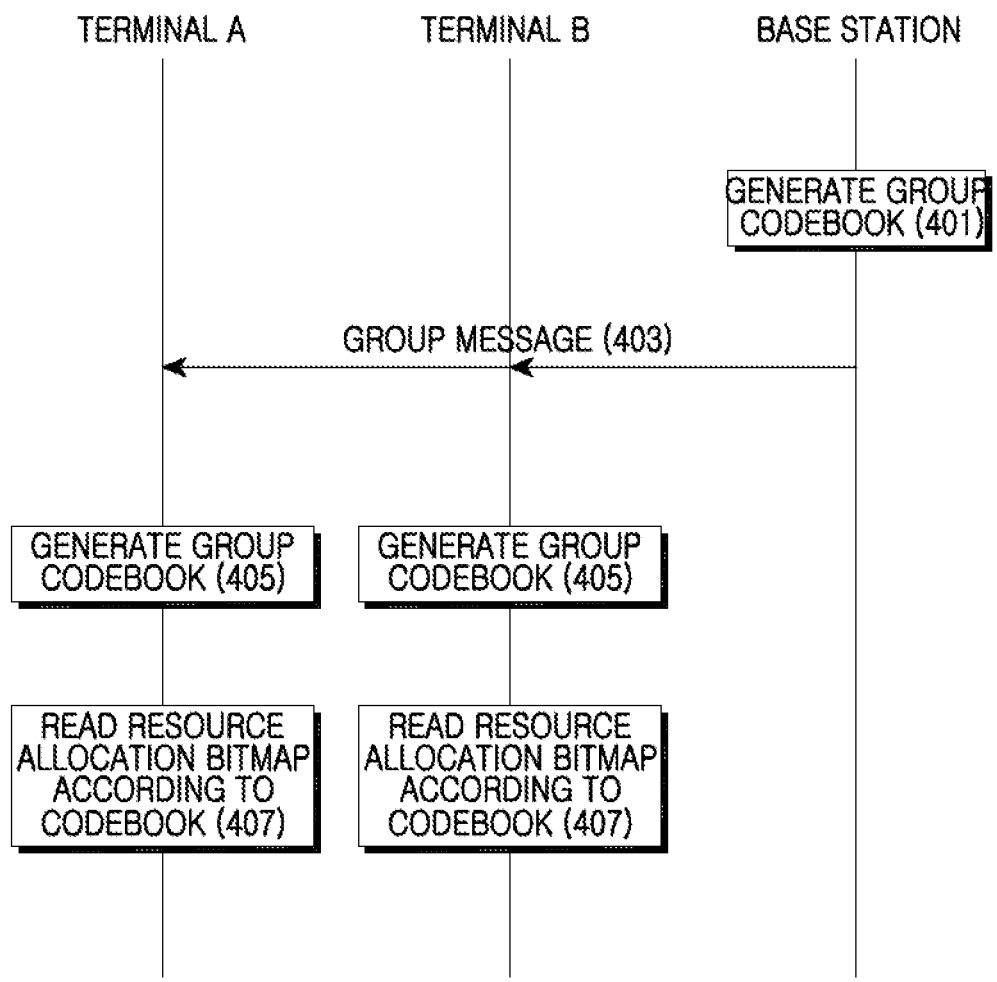
FIGS. 4 and 5 are diagrams illustrating a terminal and a base station using a Group Resource Allocation (GRA) scheme in a broadband wireless communication system according to an exemplary embodiment of the present invention.
Figure 5:
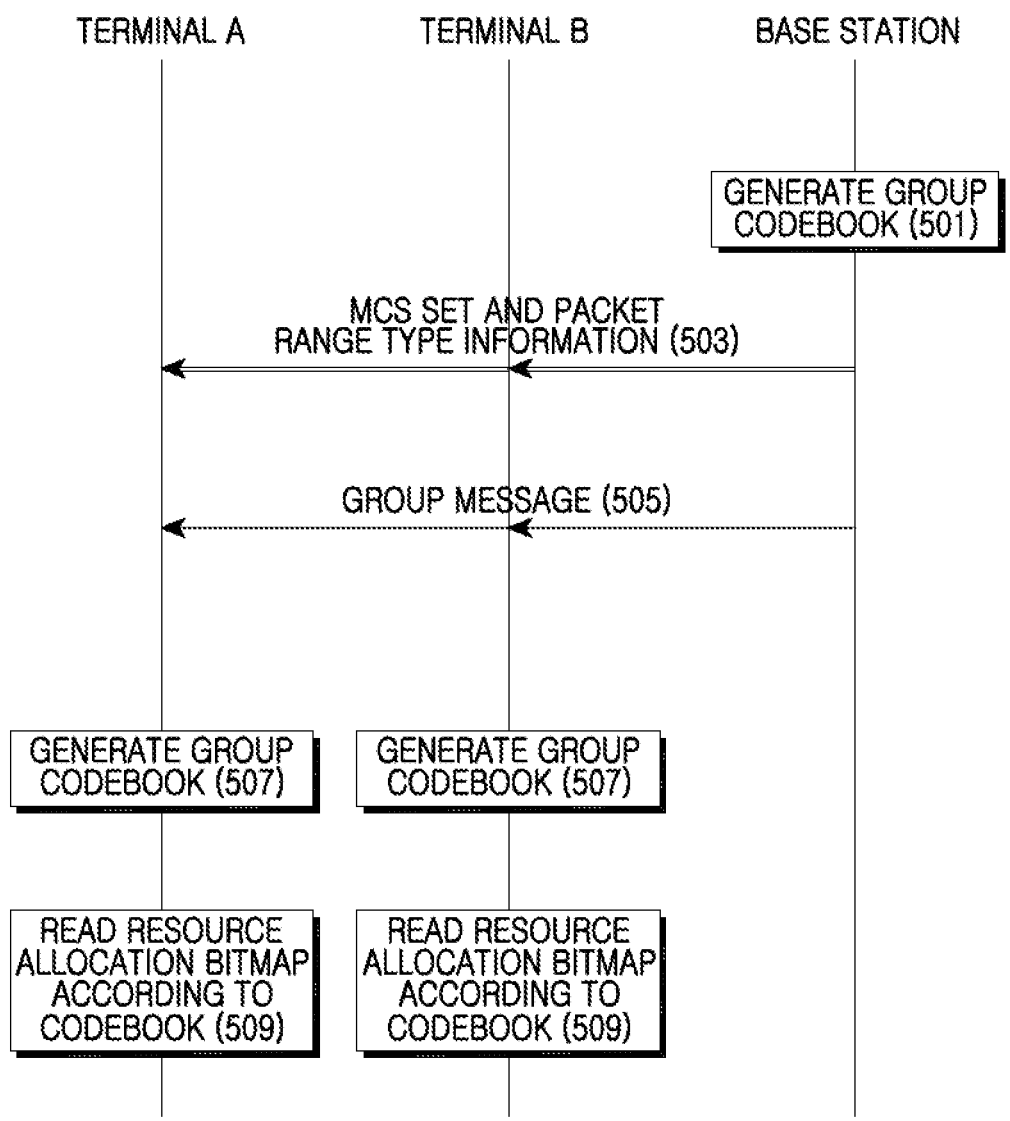

In the case where the codebook-based resource allocation information is used for the GRA scheme, operations of a base station and terminals are summarized as in FIGS. 4 and 5.

FIG. 4 is a diagram illustrating a terminal and a base station using a GRA scheme in a broadband wireless communication system according to an exemplary embodiment of the present invention. An operation in the case of informing the supportable MCS level candidates and packet size candidates of the group is illustrated.

Referring to FIG. 4, a base station determines supportable MCS level candidates and packet size candidates of a group in order to apply a GRA scheme, and generates a group codebook according to the determined MCS level candidates and packet size candidates in step 401. At this point, to determine the available MCS level candidates and packet size candidates of the group, the base station may consider a type of a service currently in progress, size distribution of occurring packets, MCS level distribution, etc.

The base station transmits a group message including information informing the MCS level candidates and the packet size candidates in step 403. Here, the group message includes not only information informing the MCS level candidates and the packet size candidates, but also information indicating group joining of a terminal A and a terminal B, a user bitmap, and a resource allocation bitmap. In addition, the information indicating the group joining includes service identification information of the terminal A and the terminal B that have joined the group, and user bitmap index allocation information. For convenience in description, the information indicating the group joining is referred to as 'group join indicate information'.

The terminal A and the terminal B that have received the group message determine the MCS level candidates and the packet size candidates included in the group message, and generate a group codebook according to the MCS level candidates and the packet size candidates in step 405. The terminal A and the terminal B determine MCS levels and resource sizes allocated to themselves by reading a resource allocation bitmap included in the group message according to the codebook in step 407.

In FIG. 4, the group join indicate information is transmitted via the group message. However, according to an exemplary embodiment of the present invention, the group join indicate information may be transmitted via a separate message. In this case, the terminal A and the terminal B determine they have joined the group via the separate message, and generate a codebook according to MCS level candidates and packet size candidates transferred via the group message.

In addition, in FIG. 4, the base station and the terminal directly generate a codebook. However, according to an exemplary embodiment of the present invention, the base station and the terminal may use one of codebooks defined in advance. In this case, the base station generates a codebook for generating and reading resource allocation information by selecting one codebook corresponding to the MCS level candidates and the packet size candidates determined in step 401 from a plurality of stored codebooks, and loading the selected codebook. In addition, terminal generates a codebook for generating and reading resource allocation information by selecting one codebook corresponding to MCS level candidates and packet size candidates included in the group message, and loading the selected codebook. However, when one codebook corresponding to the MCS level candidates and the packet size candidates does not exist among the plurality of stored codebooks, the base station and the terminal generate a codebook.

FIG. 5 is a diagram illustrating a terminal and a base station using a GRA scheme in a broadband wireless communication system according to an exemplary embodiment of the present invention. An operation in the case of informing supportable MCS level candidates and packet size candidates of a group is illustrated.

Referring to FIG. 5, a base station selects one MCS set and one packet range type from MCS sets defined in advance and packet range types defined in advance in order to apply a GRA scheme, and generates a group codebook according to the selected MCS set and packet range type in step 501. At this point, to select the MCS set and the packet type range, the base station may consider a type of a service currently in progress, size distribution of occurring packets, MCS level distribution, etc.

The base station transmits a broadcasting message including information of MCS sets and packet range types defined in advance in step 503. The broadcasting message includes all MCS set indicators and packet range type indicators, and information representing MCS level candidates represented by the MCS set indicators, and packet size ranges represented by the packet range type indicators. For example, the broadcasting message may be a message transmitted via a BCH such as DCD/UCD, superframe header, etc. At this point, though a specific transmission point of the broadcasting message is not shown, the broadcasting message is periodically transmitted.

The base station transmits a group message including an MCS set indicator and a packet range type indicator in step 505. Here, the group message includes not only the MCS set indicator and the packet range type indicator, but also group join indicate information of a terminal A and a terminal B, a user bitmap, and a resource allocation bitmap. In addition, the group join indicate information includes identification information of services of the terminal A and the terminal B that have joined the group, and user bitmap index allocation information.

The terminal A and the terminal B that have received the group message determine the MCS level indicator and the packet range type indicator included in the grope message, and generate group codebooks according to the MCS level indicator and the packet range type indicator in step 507. The terminal A and the terminal B determine an MCS level and a resource size of a resource allocated to themselves by reading a resource allocation bitmap included in the group message according to the codebook in step 509.

In FIG. 5, group join indicate information is transmitted via the group message. However, according to an exemplary embodiment of the present invention, the group join indicate information may be transmitted via a separate message. In this case, the terminal A and the terminal B determine they have joined the group via the separate message, and generate codebooks according to an MCS set indicator and a packet range type indicator transferred via the group message.

In addition, in FIG. 5, the base station and the terminal directly generate a codebook. However, according to an exemplary embodiment of the present invention, the base station and the terminal may use one of codebooks defined in advance. In this case, the base station generates a codebook for generating and reading resource allocation information by selecting one codebook corresponding to the MCS set and the packet range type selected in step 501 from a plurality of stored codebooks, and loading the selected codebook. In addition, a terminal generates a codebook for generating and reading resource allocation information by selecting one codebook corresponding to an MCS set indicator and a packet range type indicator included in the group message, and loading the selected codebook. However, when one codebook corresponding to the MCS set and the packet range type does not exist among the plurality of stored codebooks, the base station and the terminal generate a codebook.

In FIGS. 4 and 5, information informing the MCS level candidates and the packet size candidates to generate a group codebook is included in the group message. However, according to an exemplary embodiment of the present invention, the information informing the MCS level candidates and the packet size candidates may be transmitted via a separate message. That is, separately from a group resource allocation message for allocating resources of terminals inside a group, a 'group configuration message' transferring information informing a group join indicate, the MCS level candidates, the packet size candidates, bitmap index allocation information, etc. is used. The group configuration message is transmitted as a portion of a MAP message, or a separate Media Access Control (MAC) management message. For example, in the case of a group applying a Hybrid Automatic Repeat reQuest (HARQ) technique, the group resource allocation message includes fields illustrated in Table 3, and the group configuration message includes fields illustrated in Table 4.

TABLE 3

| Syntax | Notes |
| --- | --- |
| Resource Offset | Indicates starting LRU for resource assignment to this group. |
| ACK Channel Offset | Indicates the start of ACK index used for scheduled allocations at this subframe in the group. |
| HARQ ReTx Indicator | Indicates whether this group resource assignment IE is for HARQ retransmissions or initial transmission. |
| User Bitmap Size | Size of the user bitmap; may not be needed if user bitmap size is included in configuration message/A-MAP IE. |
| User Bitmap | Bitmap to indicate scheduled users in a group. The size of the bitmap is equal to the User Bitmap Size. |
| Resource Allocation Bitmap | Bitmap to indicate MCS/resource size for each scheduled user. |
| Padding | Padding to reach byte boundary. |
| MCRC | 16 bit masked CRC. |

TABLE 4

| Syntax | Notes |
| --- | --- |
| Group ID | Indicates group index. |
| MCS Set ID | Indicates MCS set supported in the group that is selected from [the predefined MCS set candidates][the configured MCS set candidates in additional broadcast message]. |
| HARQ Burst Size Set ID | Indicates HARQ data burst size set supported in the group that is selected from the configured HARQ data burst size set candidates in additional broadcast message. |
| Long TTI | Indicates the utilization of Long TTI. |
| User Bitmap Index | Indicates User Bitmap index to the AMS. An AMS may have multiple User Bitmap Indexes in a group. |
| Initial ACID | Indicates the start of ACID used for group resource allocation. |
| N_ACID | Indicates the number of ACIDs used for group resource allocation. |
| Padding | Padding to reach byte boundary. |
| MCRC | 16 bit masked CRC. |

A base station can perform group-based resource allocation using the group configuration message and the group resource allocation message. That is, in the case of allowing a terminal to join a group with respect to downlink communication or uplink communication, the base station transmits the group configuration message. In addition, the base station transmits the group resource allocation message when allocating a resource. At this point, the resource allocation message may be included in a user-specific resource assignment of a MAP message. At this point, the group resource allocation message indicates a terminal that is allocated a resource, a size of an allocated resource, an allocated MCS level, etc. At this point, the base station and the terminals generate a codebook of a group via the following procedure.

A base station makes semi-dynamic allocation of a resource size easy depending on group configuration such as an MCS set (=MCS level candidates) and a burst size set (=packet size candidates) through group-based resource allocation. A base station selects one MCS set to be applied to a group from sets defined in advance, and indicates an MCS set IDentifier (ID) to terminals inside the group via the group configuration message. In the case of changing an MCS set of the group, the base station may select the selected MCS set again. In this case, the MCS set changed through the group configuration message is informed. For example, the MCS sets may be determined in advance as shown in Table 5.

TABLE 5

| MCS set ID | MCS level | | | |
| --- | --- | --- | --- | --- |
| 000 | QPSK 31/256 | QPSK 47/250 | QPSK 70/256 | QPSK 98/256 |
|  | QPSK 131/256 | QPSK 166/256 | QPSK 199/256 | 16 QAM 123/256 |
|  | 16 QAM 149/256 | 16 QAM 176/256 | 16 QAM 204/256 | 16 QAM 229/256 |
|  | 64 QAM 173/256 | 64 QAM 196/256 | 64 QAM 218/256 | 64 QAM 234/256 |
| 001 | QPSK 31/256 | QPSK 47/250 | QPSK 70/256 | QPSK 98/256 |
|  | QPSK 131/256 | QPSK 166/256 | QPSK 199/256 | 16 QAM 123/256 |
| 010 | 16 QAM 149/256 | 16 QAM 176/256 | 16 QAM 204/256 | 16 QAM 229/256 |
|  | 64 QAM 173/256 | 64 QAM 196/256 | 64 QAM 218/256 | 64 QAM 234/256 |
| 011 | QPSK 31/256 | QPSK 47/250 | QPSK 70/256 | QPSK 98/256 |
| 100 | QPSK 131/256 | QPSK 166/256 | QPSK 199/256 | 16 QAM 123/256 |
| 101 | 16 QAM 149/256 | 16 QAM 176/256 | 16 QAM 204/256 | 16 QAM 229/256 |
| 110 | 64 QAM 173/256 | 64 QAM 196/256 | 64 QAM 218/256 | 64 QAM 234/256 |

However, depending on the intention of an operator of an exemplary embodiment of the present invention, available MCS sets may not be defined in advance as shown in Table 5, but may be dynamically determined by the base station. When the MCS sets are dynamically determined, the base station should provide information of MCS sets to terminals periodically.

In addition, like the MCS sets, available burst size sets may be determined in advance, or may be dynamically determined. Likewise, when the burst size sets are dynamically determined, the base station should provide information of the burst size sets to terminals periodically.

After recognizing MCS sets and burst size sets of the group, the base station and the terminals generate combinations of MCS levels and burst sizes using MCS levels and burst sizes supported by the group, that is, MCS levels included in the MCS set and burst sizes included in the burst size set. In addition, the base station and the terminals configure a table using the combinations, an example of which is shown in Table 6.

TABLE 6

| MCS/data burst size | S1 | S2 | ... | B (Highest burst size) |
|---|---|---|---|---|
| L1 | C(1, 1) | C(1, 2) | ... | C(1, B) |
| L2 | C(2, 1) | C(2, 2) | ... | C(2, B) |
| ... | ... | ... | ... | ... |
| M (Highest MSC) | C(M, 1) | C(M, 2) | ... | C(M, B) |

Wherein, a horizontal axis represents a burst size in unit of byte, and a vertical axis represents an MCS level. Each combination is identified using an index of an MCS level and an index of a burst size.

After configuring Table 6, the base station and the terminals remove useless combinations. That is, of all combinations included in Table 6, there exist combinations requiring the same resource size although they have different burst sizes with respect to the same MCS level, and also, there exist combinations requiring the same resource size although they have different MCS levels with respect to the same burst size. Therefore, the base station and the terminals remove all or a portion of the useless combinations, so that a code length of the codebook can be optimized.

First, the base station and the terminals determine useless combinations of combinations requiring the same resource size although different MCS levels are required. In other words, with respect to each burst size, that is, inside each column, when there exists a combination requiring the same resource size as that of a combination having a lower MCS level than an MCS level of the combination, the combination is selected as an element of a first useless combination set. This is expressed using Equation (5).

$$\{C(m,b)\} \to U1 \text{ if } N(m,b)=N(n,b) \text{ where } m>n \quad (5)$$

Wherein, $C(m,b)$ is a combination of an m-th MCS level and a b-th burst size, U1 is a first useless combination set, and $N(m,b)$ is a resource size used by a combination of an m-th MCS level and a b-th burst size.

In addition, with respect to each MCS level, that is, in each row, when there exists a combination requiring the same resource size as that of a combination having a lower burst size than a burst size of the combination, the combination is selected as an element of a second useless combination set. This is expressed using Equation (6).

$$\{C(m,b)\} \to U2 \text{ if } N(m,b)=N(m,d) \text{ where } b>d \quad (6)$$

Wherein, $C(m,b)$ is a combination of an m-th MCS level and a b-th burst size, U2 is a second useless combination set, and $N(m,b)$ is a resource size used by a combination of an m-th MCS level and a b-th burst size.

After determining the first useless combination set and the second useless combination set, that is, determining all useless combinations, the base station and the terminals determine an effective combination set by removing the first useless combination set and the second useless combination set from all the combinations. This is expressed using Equation (7).

$$E=C-U1-U2 \quad (7)$$

Wherein, E is an effective combination set, C is a set including all combinations, U1 is a first useless combination set, and U2 is a second useless combination set.

Here, for simplification of operation, only one of the first useless combination set and the second useless combination set may be removed. For example, the base station and the terminals may remove only the first useless combination set from all the combinations, and use the rest of the combinations as an effective combination set.

Last, codes are assigned to respective effective combinations included in the effective combination set. At this point, the codes are assigned according to a predefined rule. For example, the codes are sequentially assigned from the left upper end to the right direction or the downward direction in Table 6 with respect to effective combinations. That is, codes may be assigned according to an ascending order from a combination having a minimum MCS level and a minimum burst size. The code is used for indicating a combination of a resource size and an MCS level. At this point, a length of the code may be determined using Ceil{log 2(the number of effective combinations)} optimized for the number of the effective combinations, or using a value defined in advance.

The base station generates a group codebook when generating a group as described above. In addition, to allow a terminal to join the group, the base station transmits group information to the terminal via the group configuration message so that the terminal may read a resource allocation bitmap included in the group resource allocation message. In other words, the base station transmits information used for generating the group codebook, that is, information of an MCS set and a burst size set to the terminal. Accordingly, the terminal obtains the information of the MCS set and the burst size set, and then generates the group codebook. At this point, according to an exemplary embodiment of the present invention, the base station may transmit the group codebook itself instead of the information of the MCS set and the burst size set. In this case, an overhead due to the group configuration message increases, but an operation burden of the terminal due to the group codebook generation disappears.

If a MCS level or a resource size of a terminal deviates from a range of a group codebook, the terminal is deleted from the group. To allow the terminal to be deleted from the group, the base station indicates the deletion using a bitmap index of the terminal via the group resource allocation message.

As described above, codebook-based resource allocation information may be used for a GRA scheme. Codes included in the codebook discriminate combinations of a specific number of MCS levels and packet sizes. At this point, there may exist a terminal using packets whose number is the same but whose size values are collectively shifted depending on whether a header is compressed and whether a security field is added. For example, a terminal A uses packets of sizes ranging from 16 bytes to 42 bytes, and a terminal B may use packets of sizes ranging from 36 (=16+16) bytes to 58 (=42+

16) bytes due to addition of a security field of a size of 16 bytes. In this case, since the terminal A and the terminal B should not belong to the same group, they may use codebook-based resource allocation information proposed by an exemplary embodiment of the present invention by joining groups that use different codebooks, respectively, or using an individual resource allocation scheme. However, according to an exemplary embodiment of the present invention, the terminal A and the terminal B may perform communication in the same group.

The terminal A and the terminal B use the same number of packet sizes. However, packet sizes used by the terminal A and packet sizes used by the terminal B have shifted values. Therefore, when a packet size range of the group codebook coincides with a packet size range of the terminal A, an offset value is collectively applied to packet sizes of the group codebook, so that the terminal B can use the group codebook. For this purpose, the terminal A, the terminal B, and the base station should share the offset value with one another. Generally, since whether to compress a header and whether to add a security field are negotiated when a service flow is generated, the terminal B and the base station can calculate the offset value. However, since the terminal A cannot calculate the offset value, the base station should inform terminals including the terminal A that have joined the group of the offset value via separate signaling. For example, to share the offset value, the base station incorporates an offset value of the terminal B into a group message.

Hereinafter, constructions and operations of a base station and a terminal that use codebook-based resource allocation information are described in more detail with reference to the drawings.

Figure 6:
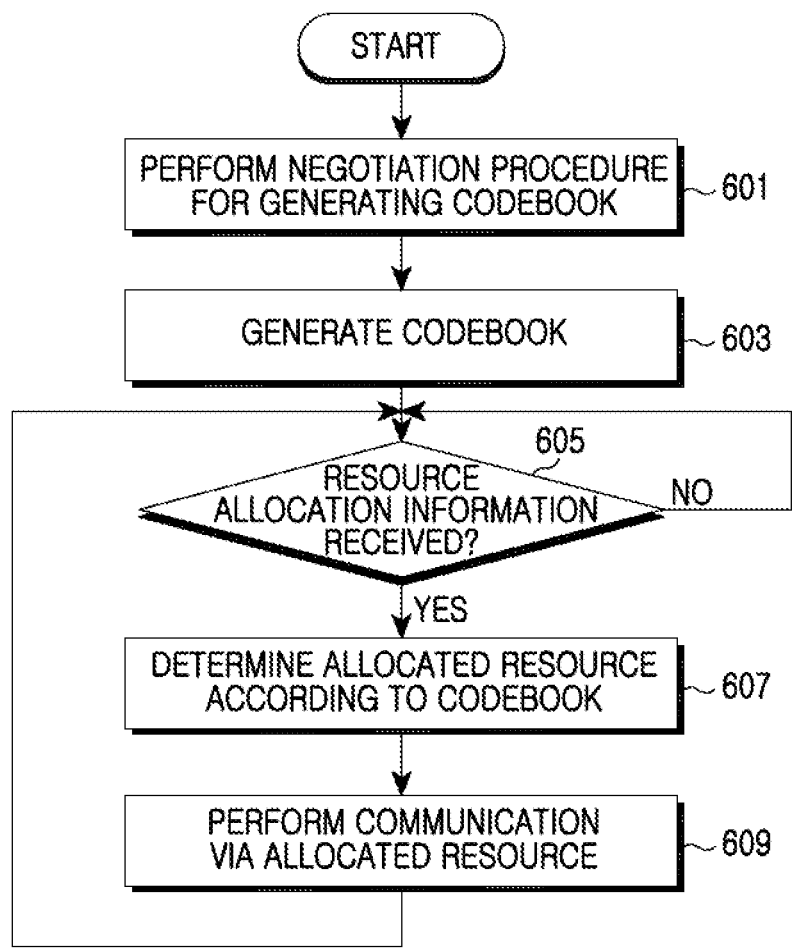
FIG. 6 is a flowchart illustrating an operation procedure of a terminal in a broadband wireless communication system according to an exemplary embodiment of the present invention.

FIG. 6 is a flowchart illustrating an operation procedure of a terminal in a broadband wireless communication system according to an exemplary embodiment of the present invention. An operation procedure of a terminal using an individual resource allocation scheme is illustrated.

Referring to FIG. 6, the terminal performs a negotiation procedure for generating a codebook in step 601. In other words, the terminal performs a negotiation procedure for determining MCS level candidates and packet size candidates. For this purpose, the terminal transmits at least one of a negotiation indicate message and a negotiation confirm message. For example, the terminal transmits a negotiation indicate message to a base station, and receives a negotiation confirm message from the base station. Alternatively, the terminal receives a negotiation indicate message from the base station, and transmits a negotiation confirm message to the base station. At this point, depending on the intention of an operator of the exemplary embodiment of the present invention, transmission/reception of the negotiation confirm message may be omitted.

After performing the negotiation procedure, the terminal generates a codebook in step 603. At this point, the terminal generates the codebook according to a predefined rule. In more detail, the terminal calculates the number of transmittable data bits per RU using Equation (1), and calculates resource sizes for each MCS level using Equation (2). Subsequently, the terminal calculates the number of codes to be included in the codebook using Equation (3), and calculates a code length using Equation (4). After that, the terminal assigns codes to combinations of MCS levels and resource sizes.

After generating the codebook, the terminal determines whether resource allocation information is received in step 605. At this point, the resource allocation information includes the codes. That is, the base station possesses the same codebook as the codebook generated by the terminal, and transmits resource allocation information indicating an MCS level and a resource size using the code.

If it is determined in step 605 that the resource allocation information is received, the terminal determines an allocated resource by reading the resource allocation information according to the codebook in step 607. That is, the terminal searches for a code included in the resource allocation information inside the codebook, and determines an MCS level and a resource size corresponding to the found code.

After determining the allocated resource, the terminal performs communication via the allocated resource in step 609. After that, the terminal returns to step 605 and repeatedly performs the present procedure until communication with the base station ends.

In FIG. 6, the terminal directly generates the codebook in step 603. However, according to an exemplary embodiment of the present invention, the terminal may use one of codebooks defined in advance. In this case, the terminal generates a codebook for reading resource allocation information by selecting one codebook corresponding to the MCS level candidates and the packet size candidates determined via the negotiation procedure of step 601 from a plurality of stored codebooks, and loading the selected codebook. However, when one codebook corresponding to the MCS level candidates and the packet size candidates determined via the negotiation procedure does not exist among the plurality of stored codebooks, the terminal generates a codebook.

Figure 7:
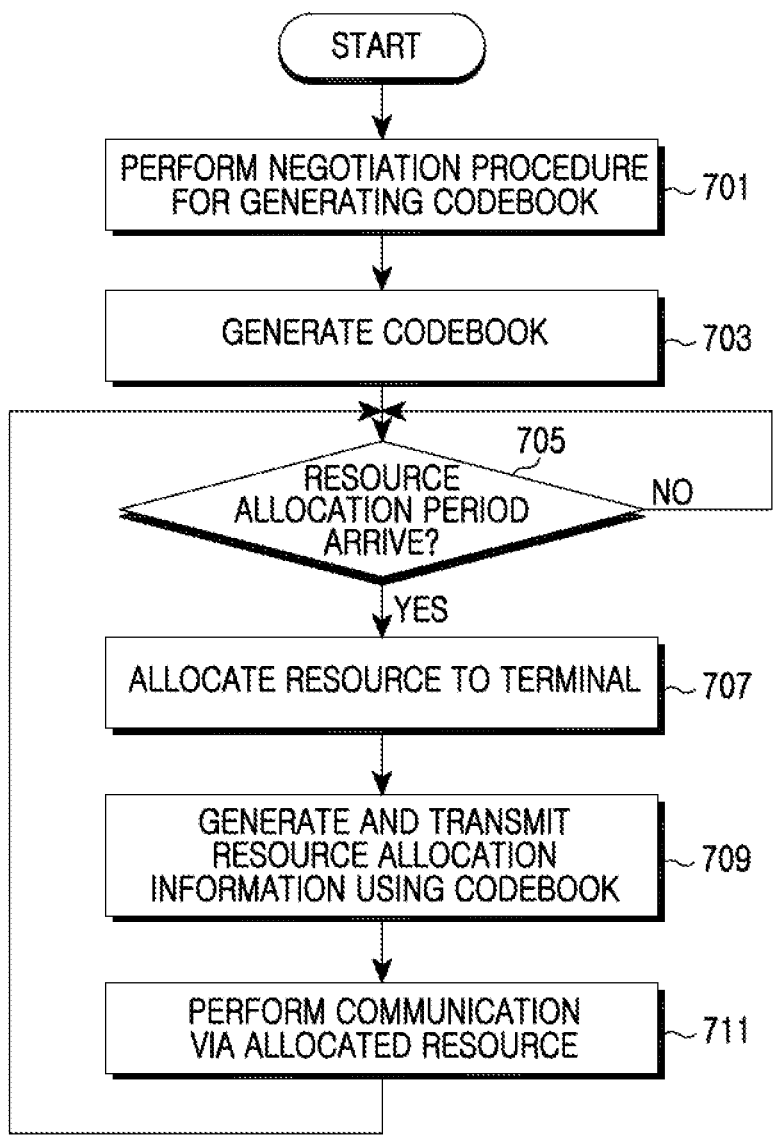
FIG. 7 is a flowchart illustrating an operation procedure of a base station in a broadband wireless communication system according to an exemplary embodiment of the present invention.

FIG. 7 is a flowchart illustrating an operation procedure of a base station in a broadband wireless communication system according to an exemplary embodiment of the present invention. An operation procedure of a base station that uses an individual resource allocation scheme is illustrated.

Referring to FIG. 7, the base station performs a negotiation procedure for generating a codebook in step 701. In other words, the base station performs a negotiation procedure for determining MCS level candidates and packet size candidates. For this purpose, the base station transmits at least one of a negotiation indicate message and a negotiation confirm message. For example, the base station transmits a negotiation indicate message to a terminal, and receives a negotiation confirm message from the terminal. Alternatively, the base station receives a negotiation indicate message from the terminal, and transmits a negotiation confirm message to the terminal. At this point, depending on the intention of an operator of the exemplary embodiment of the present invention, transmission/reception of the negotiation confirm message may be omitted.

After performing the negotiation procedure, the base station generates a codebook in step 703. At this point, the base station generates the codebook according to a predefined rule. In more detail, the base station calculates the number of transmittable data bits per RU using Equation (1), and calculates resource sizes for each MCS level using Equation (2). Subsequently, the base station calculates the number of codes to be included in the codebook using Equation (3), and calculates a code length using Equation (4). After that, the base station assigns codes to combinations of MCS levels and resource sizes.

The base station determines whether a resource allocation period arrives in step 705. For example, the resource allocation is performed on a subframe basis.

If it is determined in step 705 that the resource allocation period arrives, the base station allocates a resource to the terminal in step 707. At this point, the base station allocates a resource on an RU basis, and allocates a resource within a range of the MCS level candidates determined via the negotiation procedure and the resource sizes calculated in step 703.

After allocating the resource to the terminal, the base station generates resource allocation information using the codebook in step 709. In other words, the base station generates the resource allocation information formed of codes included in the codebook. That is, the base station searches for a code corresponding to a combination of the allocated MCS level and the allocated resource size inside the codebook, and generates the resource allocation information including the found code. In addition, the base station transmits the resource allocation information.

After transmitting the resource allocation information, the base station performs communication via the allocated resource in step 711. After that, the base station returns to step 705 and repeatedly performs the present procedure until communication with the terminal ends.

In FIG. 7, the base station directly generates a codebook in step 703. However, according to an exemplary embodiment of the present invention, the base station may use one of codebooks defined in advance. In this case, the base station generates the codebook for generating resource allocation information by selecting one codebook corresponding to the MCS level candidates and the packet size candidates determined via the negotiation procedure in step 703 from a plurality of stored codebooks, and loading the selected codebook. However, when one codebook corresponding to the MCS level candidates and the packet size candidates determined via the negotiation procedure does not exist among the plurality of stored codebooks, the base station generates a codebook.

Figure 8:
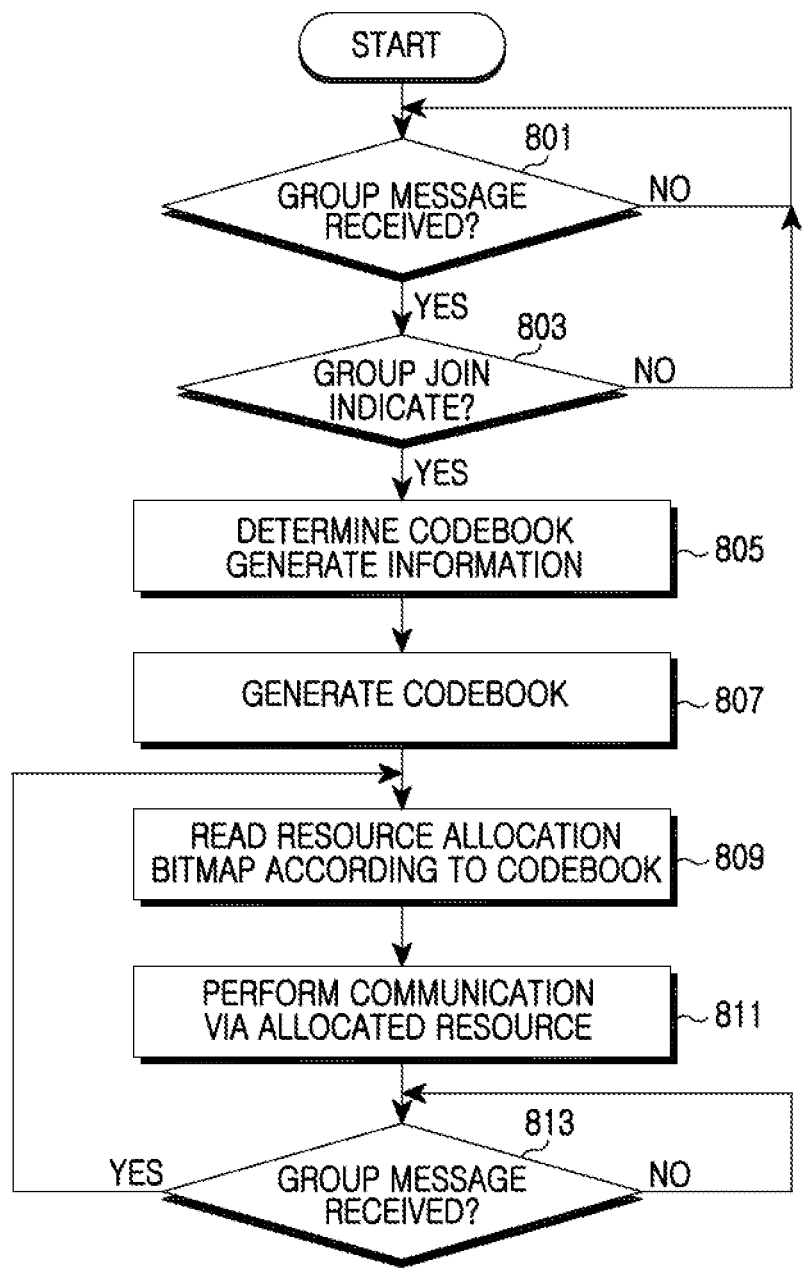
FIG. 8 is a flowchart illustrating an operation procedure of a terminal in a broadband wireless communication system according to an exemplary embodiment of the present invention.

FIG. 8 is a flowchart illustrating an operation procedure of a terminal in a broadband wireless communication system according to an exemplary embodiment of the present invention. An operation procedure of a terminal that uses a GRA scheme is illustrated.

Referring to FIG. 8, the terminal determines whether a group message is received in step 801. The group message is a message for group resource allocation, and includes a user bitmap indicating a terminal that is allocated a resource in a group, and a resource allocation bitmap representing an MCS level and a resource size of an allocated resource.

If it is determined in step 801 that the group message is received, the terminal determines whether group join is indicated in step 803. That is, indication of the group join is performed via the group message. Therefore, the terminal determines whether group join indicate information and user bitmap index allocation information are included in the group message. However, according to an exemplary embodiment of the present invention, the indication of the group join may be performed via a separate message instead of the group message.

If it is determined in step 803 that the group join is indicated, the terminal determines codebook generation information via the group message in step 805. Here, the codebook generation information is information included in the group message to generate a codebook of the terminal, and denotes supportable MCS level candidates and packet size candidates of the group. That is, the group message includes the supportable MCS level candidates and packet size candidates of the group so that a terminal that has joined a group may generate a codebook. However, according to an exemplary embodiment of the present invention, the codebook generation information may be received via a separate message instead of the group message.

After determining the codebook generation information, the terminal generates a codebook in step 807. At this point, the terminal generates a codebook according to a predefined rule. In more detail, the terminal calculates the number of transmittable data bits per RU using Equation (1), and calculates resource sizes for each MCS level using Equation (2). Subsequently, the terminal calculates the number of codes to be included in a codebook using Equation (3), and calculates a code length using Equation (4). After that, the terminal assigns codes to combinations of MCS levels and resource sizes. At this point, when an offset value is applied to the terminal, the terminal collectively adds the offset value to the packet size candidates, and then calculates the resource sizes.

After generating the codebook, the terminal reads a resource allocation bitmap included in the group message according to the codebook in step 809. That is, the terminal extracts a code corresponding to the terminal from the resource allocation bitmap, and determines an allocated resource using the code. In other words, the terminal searches for the code in the codebook, and determines an MCS level and a resource size corresponding to the found code.

After determining the allocated resource, the terminal performs communication via the allocated resource in step 811. The terminal determines whether a group message is received in step 813, and if it is determined in step 813 that the group message is received, the procedure returns to step 809.

In FIG. 8, the terminal directly generates a codebook in step 807. However, according to an exemplary embodiment of the present invention, the terminal may use one of codebooks defined in advance. In this case, the terminal generates a codebook for reading resource allocation information by selecting one codebook corresponding to the MCS level candidates and the packet size candidates of the group determined in step 805 from a plurality of stored codebooks, and loading the selected codebook. However, when one codebook corresponding to the MCS level candidates and the packet size candidates of the group does not exist among the plurality of stored codebooks, the terminal generates a codebook. In addition, according to an exemplary embodiment of the present invention, the terminal may not directly generate the codebook but receive a codebook from the base station. In this case, steps 805 and 807 are replaced by a process for determining codebook information included in a message.

Figure 9:
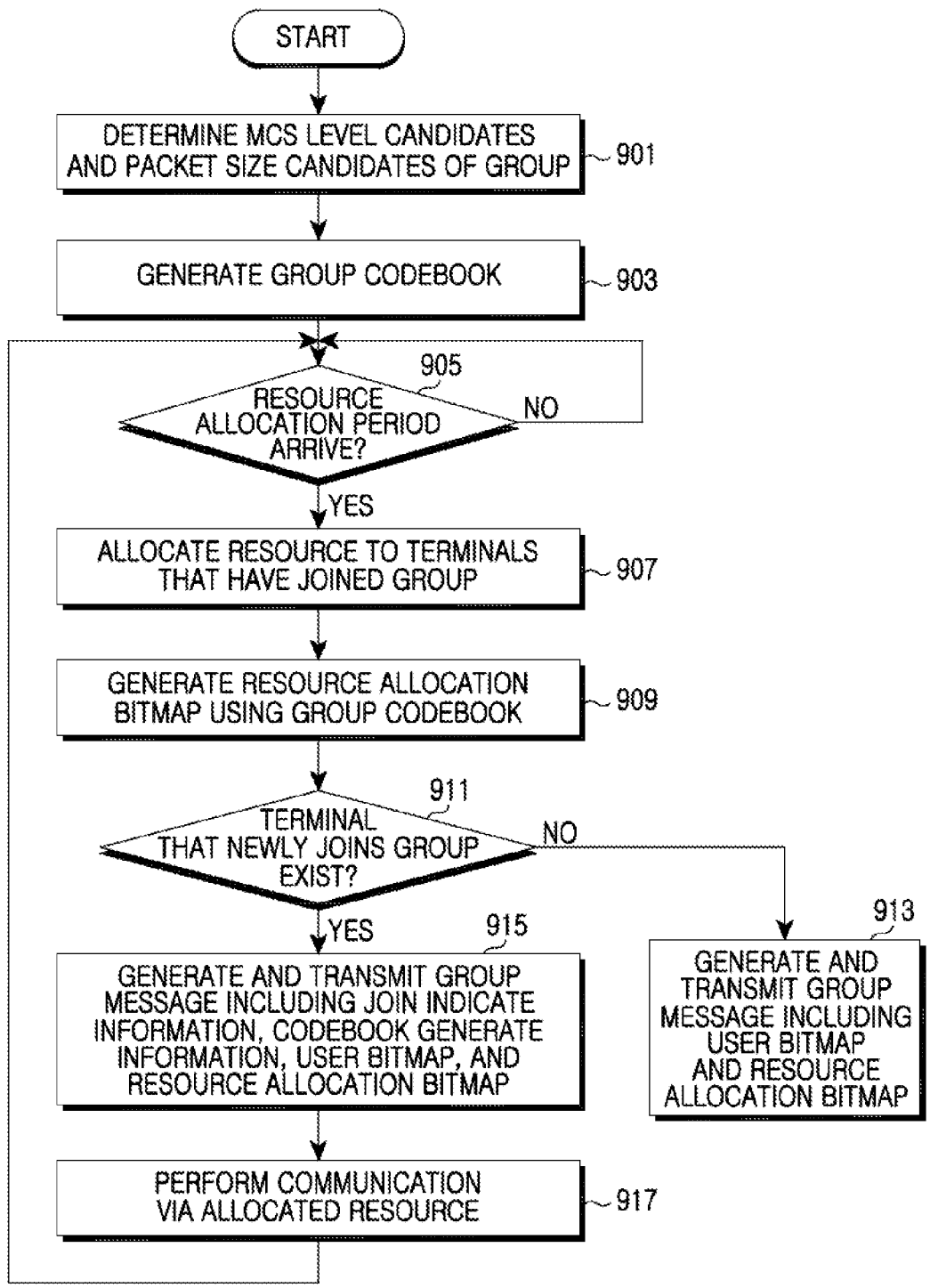
FIG. 9 is a flowchart illustrating an operation procedure of a base station in a broadband wireless communication system according to an exemplary embodiment of the present invention.

FIG. 9 is a flowchart illustrating an operation procedure of a base station in a broadband wireless communication system according to an exemplary embodiment of the present invention. An operation procedure of a base station that uses a GRA scheme is illustrated.

Referring to FIG. 9, the base station determines supportable MCS level candidates and packet size candidates of a group in step 901. At this point, to determine the supportable MCS level candidates and packet size candidates of the group, the base station may consider a type of a service currently in progress, size distribution of occurring packets, MCS level distribution, etc.

After determining the supportable MCS level candidates and packet size candidates, the base station generates a group codebook in step 903. At this point, the base station generates the group codebook according to a predefined rule. In more detail, the base station calculates the number of transmittable data bits per RU using Equation (1), and calculates resource sizes for each MCS level using Equation (2). Subsequently, the base station calculates the number of codes to be included in the codebook using Equation (3), and calculates a code length using Equation (4). After that, the base station assigns codes to combinations of MCS levels and resource sizes.

After generating the codebook, the base station determines whether a resource allocation period arrives in step 905. For example, the resource allocation is performed every subframe.

If it is determined in step 905 that the resource allocation period arrives, the base station allocates resources to terminals that have joined the group in step 907. At this point, the base station allocates the resources on an RU basis, and allocates the resources within a range of the MCS level candidates determined in step 901 and the resource sizes calculated in step 903. However, when a terminal to which an offset value is applied exists, the base station allocates a resource within a range of a resource size calculated from a packet size range summing the offset value with respect to the terminal to which the offset value is applied.

After allocating the resource, the base station generates a resource allocation bitmap using the group codebook in step 909. In other words, the base station generates resource allocation information formed of codes included in the codebook. That is, the base station searches for codes corresponding to combinations of the allocated MCS level and the allocated resource size from the codebook, and generates a resource allocation bitmap including the found codes. However, when a terminal to which an offset value is applied exists, the base station searches for a code according to a correspondence relation of a separate code and a resource size depending on the offset value with respect to the terminal to which the offset value is applied.

The base station determines whether a terminal that newly joins a group exists in step 911. If it is determined in step 911 that the terminal that newly joins the group does not exist, the base station generates a group message including the user bitmap and the resource allocation bitmap, and transmits the group message in step 913.

In contrast, if it is determined in step 911 that the terminal that newly joins the group exists, the base station generates a group message including group join indicate information, codebook generation information, a user bitmap, and a resource allocation bitmap, and transmits the group message in step 915. Here, the codebook generation information is information informing the MCS level candidates and the packet size candidates determined in step 901. In addition, the group join indicate information includes user bitmap index allocation information of the terminal that newly joins the group. However, according to an exemplary embodiment of the present invention, the group join indicate information and the codebook generation information may be transmitted via a separate message instead of the group message.

After transmitting the group message, the base station performs communication via an allocated resource in step 917. After that, the procedure returns to step 905 and repeatedly performs the present procedure until the group vanishes.

In FIG. 9, the base station directly generates a codebook in step 903. However, according to an exemplary embodiment of the present invention, the base station may use one of codebooks defined in advance. In this case, the base station generates a codebook for generating resource allocation information by selecting one codebook corresponding to the MCS level candidates and the packet size candidates of the group determined in step 901 from a plurality of stored codebooks, and loading the selected codebook. However, when one codebook corresponding to the MCS level candidates and the packet size candidates of the group does not exist among the plurality of stored codebooks, the base station generates a codebook. In addition, according to an exemplary embodiment of the present invention, the base station may provide the codebook generated in step 903 to a terminal. In this case, the codebook generation information is replaced by codebook information in step 915.

Figure 10:
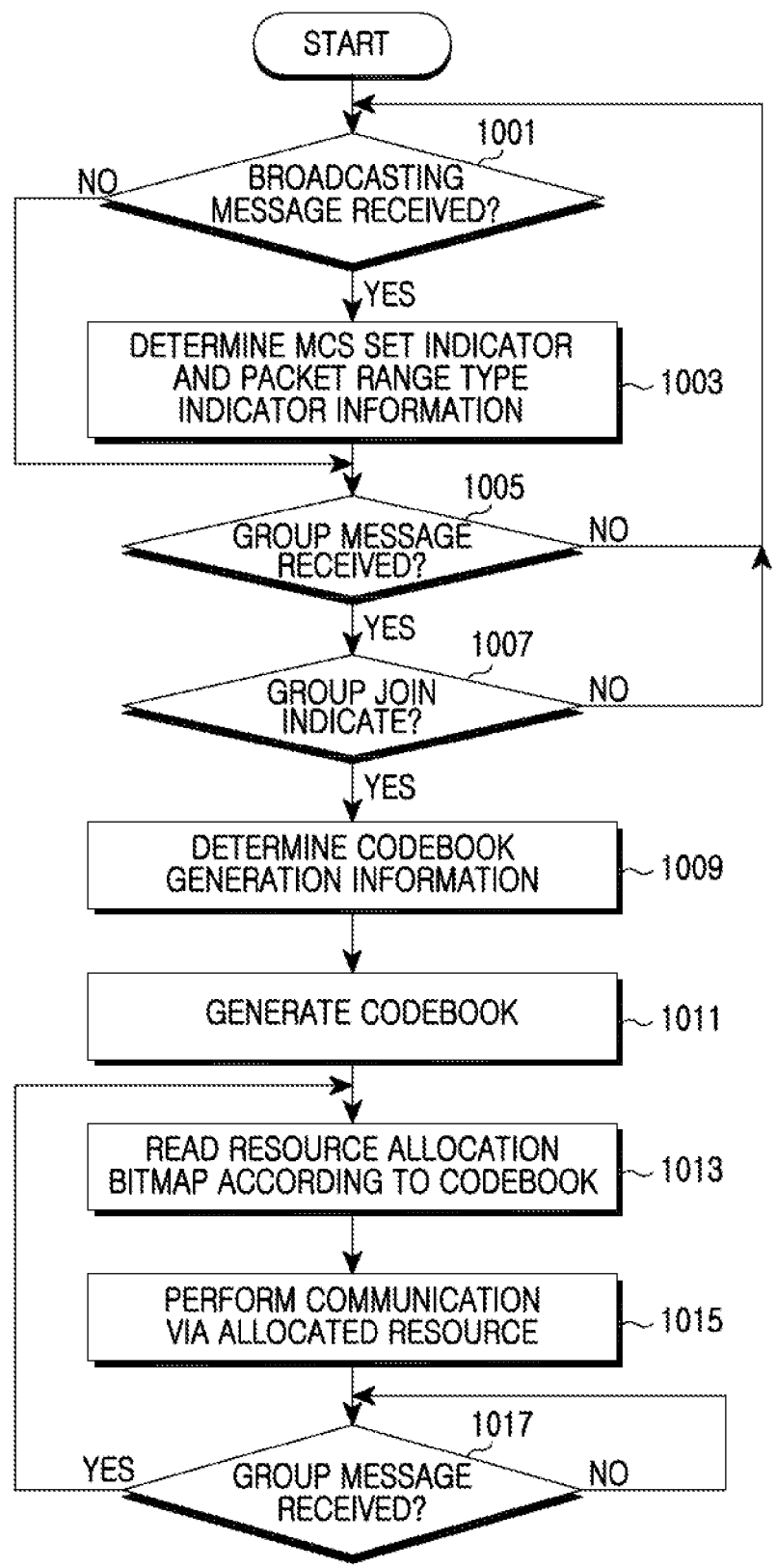
FIG. 10 is a flowchart illustrating an operation procedure of a terminal in a broadband wireless communication system according to an exemplary embodiment of the present invention.

FIG. 10 is a flowchart illustrating an operation procedure of a terminal in a broadband wireless communication system according to an exemplary embodiment of the present invention. An operation procedure of a terminal that uses a GRA scheme is illustrated.

Referring to FIG. 10, the terminal determines whether a broadcasting message is received in step 1001. Here, the broadcasting message is periodically transmitted by a base station and includes system information used for a terminal to perform communication. For example, the broadcasting message is transmitted via a BCH such as a DCD/UCD, a superframe header, etc.

If it is determined in step 1001 that the broadcasting message is received, the terminal determines information of MCS sets and packet range types included in the broadcasting message in step 1003. That is, the broadcasting message includes all MCS set indicators and packet range type indicators, and includes information representing MCS level candidates represented by the MCS set indicators and packet size ranges represented by the packet range type indicators. Accordingly, the terminal may recognize correspondence relation between the MCS set indicators and the MCS level candidates, and correspondence relation between the packet range type indicators and the packet size candidates.

In contrast, if it is determined in step 1001 that the broadcasting message is not received, the procedure proceeds to step 1005.

The terminal determines whether a group message is received in step 1005. The group message is a message for group resource allocation, and includes a user bitmap indicating a terminal that is allocated a resource within a group, and resource allocation bitmap representing an MCS level and a resource size of an allocated resource.

If it is determined in step 1005 that the group message is not received, the procedure returns to step 1001.

In contrast, if it is determined in step 1005 that the group message is received, the terminal determines whether group join is indicated in step 1007. That is, the group join indication is performed via the group message. Therefore, the terminal determines whether group join indicate information and user bitmap index allocation information are included in the group message. However, according to an exemplary embodiment of the present invention, the group join indication may be performed via a separate message instead of the group message.

If it is determined in step 1007 that the group message is not received, the procedure returns to step 1001.

In contrast, if it is determined in step 1007 that the group join is indicated, the terminal determines codebook generation information via the group message in step 1009. Here, the codebook generation information is included in the group message to generate a codebook of a terminal, and denotes an MCS set indicator and a packet range type indicator of the group according to an exemplary embodiment of the present invention. That is, the group message includes an MCS set indicator indicating an MCS set of the group, and a packet range type indicator indicating a packet range type of the group so that a terminal that joins the group may generate a codebook. However, according to an exemplary embodiment of the present invention, the codebook generation information may be received via a separate message instead of the group message.

After determining the codebook generation information, the terminal generates a codebook in step 1011. That is, after determining MCS level candidates and packet size candidates corresponding to the MCS set indicator and the packet range type indicator, the terminal generates a codebook. At this point, the terminal generates the codebook according to a predefined rule. In more detail, the terminal calculates the number of transmittable data bits per RU using Equation (1), and calculates resource sizes for each MCS level using Equation (2). Subsequently, the terminal calculates the number of codes to be included in the codebook using Equation (3), and calculates a code length using Equation (4). After that, the terminal assigns codes to combinations of MCS levels and resource sizes. At this point, when an offset value is applied to the terminal, the terminal collectively adds the offset value to the packet size candidates, and then calculates the resource sizes.

After generating the codebook, the terminal reads a resource allocation bitmap included in the group message according to the codebook in step 1013. That is, the terminal extracts a code corresponding to the terminal from the resource allocation bitmap, and determines an allocated resource using the code. In other words, the terminal searches for the code in the codebook, and determines an MCS level and a resource size corresponding to the found code.

After determining the allocated resource, the terminal performs communication via the allocated resource in step 1015. The terminal determines whether a group message is received in step 1017, and if it is determined in step 1017 that the group message is received, the procedure returns to step 1013.

In FIG. 10, the terminal directly generates a codebook in step 1011. However, according to an exemplary embodiment of the present invention, the terminal may use one of codebooks defined in advance. In this case, the terminal generates a codebook for reading resource allocation information by selecting one codebook corresponding to an MCS set indicator and a packet range type indicator of the group determined in step 1009 from a plurality of stored codebooks, and loading the selected codebook. However, when one codebook corresponding to the MCS set indicator and the packet range type indicator of the group does not exist among the plurality of stored codebooks, the terminal generates a codebook. In addition, according to an exemplary embodiment of the present invention, the terminal may not directly generate the codebook, but may receive a codebook from the base station. In this case, steps 1009 and 1011 are replaced by a process for determining codebook information included in a message.

Figure 11:
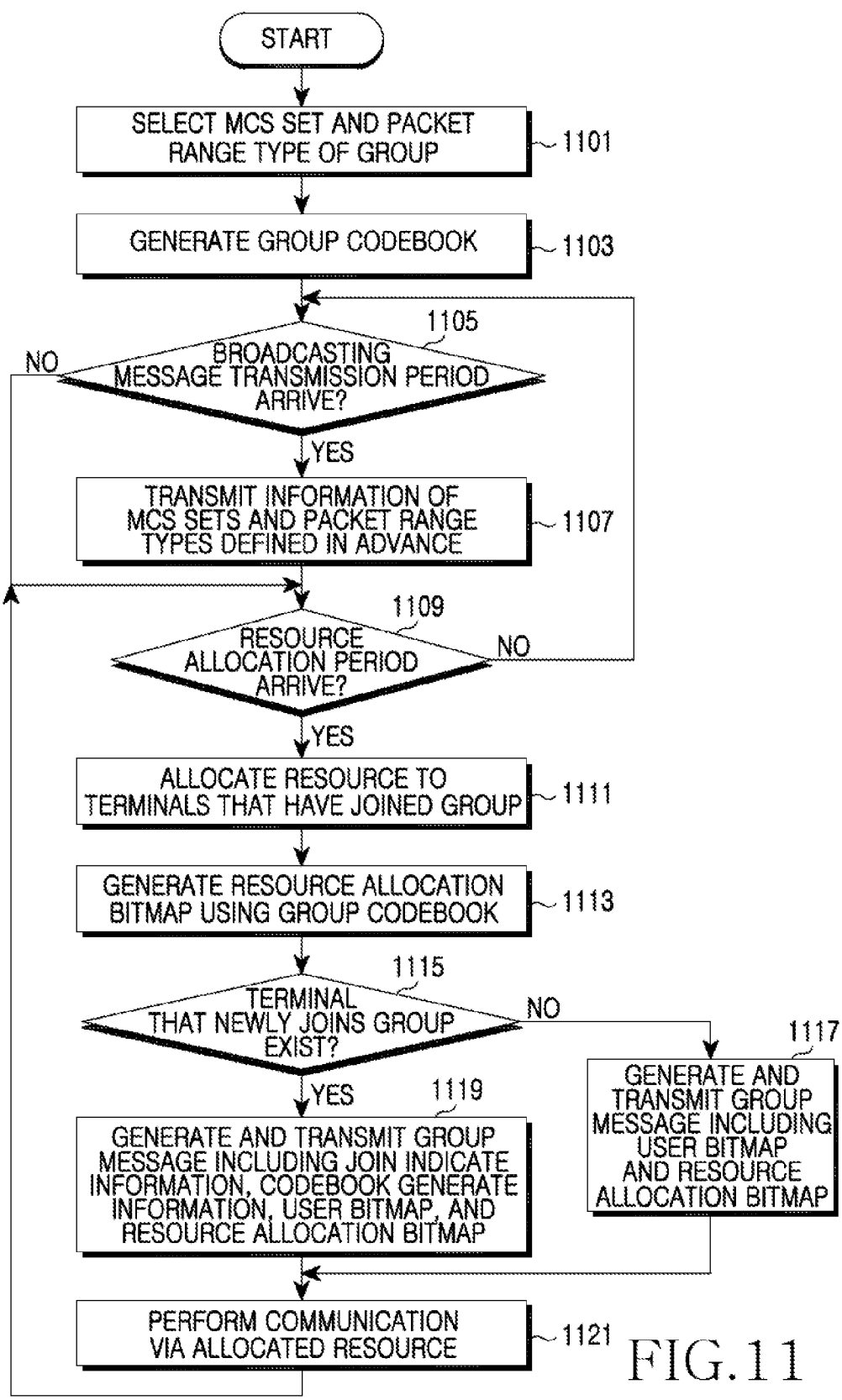
FIG. 11 is a flowchart illustrating an operation procedure of a base station in a broadband wireless communication system according to an exemplary embodiment of the present invention.

FIG. 11 is a flowchart illustrating an operation procedure of a base station in a broadband wireless communication system according to an exemplary embodiment of the present invention. An operation procedure of a base station that uses a GRA scheme is illustrated.

Referring to FIG. 11, the base station selects an MCS set and a packet range type of a group in step 1101. In other words, the base station selects one MCS set and one packet range type from MCS sets defined in advance and packet range types defined in advance. At this point, to select the MCS set and the packet range type, the base station may consider a type of a service currently in progress, size distribution of occurring packets, MCS level distribution, etc.

After selecting the MCS set and the packet range type, the base station generates a group codebook in step 1103. That is, after determining MCS level candidates and packet size candidates corresponding to the MCS set indicator and the packet range type indicator, the base station generates a codebook. At this point, the base station generates the group codebook according to a predefined rule. In more detail, the base station calculates the number of transmittable data bits per RU using Equation (1), and calculates resource sizes for each MCS level using Equation (2). Subsequently, the base station calculates the number of codes to be included in the codebook using Equation (3), and calculates a code length using Equation (4). After that, the base station assigns codes to combinations of MCS levels and resource sizes.

The base station determines whether a broadcasting message transmission period arrives in step 1105. Here, the broadcasting message is periodically transmitted by the base station and includes system information used for a terminal to perform communication. For example, the broadcasting message is transmitted via a BCH such as a DCD/UCD, a super-frame header, etc.

If it is determined in step 1105 that the transmission period of the broadcasting message arrives, the base station transmits a broadcasting message including information of available MCS sets and packet range types in step 1107. That is, the broadcasting message includes all MCS set indicators and packet range type indicators, and includes information representing MCS level candidates represented by the MCS set indicators and packet size ranges represented by the packet range type indicators. Accordingly, the terminal may recognize correspondence relation between the MCS set indicators and the MCS level candidates, and correspondence relation between the packet range type indicators and the packet size candidates.

In contrast, if it is determined in step 1105 that the transmission period of the broadcasting message does not arrive, the procedure proceeds to step 1109.

The base station determines whether a resource allocation period arrives in step 1109. For example, the resource allocation is performed every subframe.

If it is determined in step 1109 that the resource allocation period does not arrive, the procedure returns to step 1105.

If it is determined in step 1109 that the resource allocation period arrives, the base station allocates resources to terminals that have joined the group in step 1111. At this point, the base station allocates the resources on an RU basis, and allocates the resources within a range of the MCS set selected in step 1101 and the resource sizes calculated in step 1103. However, when a terminal to which an offset value is applied exists, the base station allocates a resource within a range of a resource size summing the offset value with respect to terminals to which the offset value is applied. However, when a terminal to which an offset value is applied exists, the base station allocates a resource within a range of a resource size calculated from a packet size range summing the offset value with respect to the terminal to which the offset value is applied.

After allocating the resources, the base station generates a resource allocation bitmap using the group codebook in step 1113. In other words, the base station generates resource allocation information formed of codes included in the codebook. That is, the base station searches for codes corresponding to combinations of the allocated MCS levels and the allocated resource sizes within the codebook, and generates a resource allocation bitmap including the found codes. However, when a terminal to which an offset value is applied exists, the base station searches for a code according to a correspondence relation of a separate code and a resource size depending on the offset value with respect to the terminal to which the offset value is applied.

The base station determines whether a terminal that newly joins the group exists in step 1115. If it is determined in step 1115 that a terminal that newly joins the group does not exist, the base station generates a group message including a user bitmap and a resource allocation bitmap, and transmits the group message in step 1117.

In contrast, if it is determined in step 1115 that a terminal that newly joins the group does exist, the base station generates a group message including group join indicate information, codebook generation information, a user bitmap, and a resource allocation bitmap, and transmits the group message in step 1119. Here, the codebook generation information is information informing the MCS set and the packet range type selected in step 1101. In addition, the group join indicate information includes user bitmap index allocation information of the terminal that newly joins the group. However, according to an exemplary embodiment of the present invention, the group join indicate information and the codebook generation information may be transmitted via a separate message instead of the group message.

After transmitting the group message, the base station performs communication via the allocated resource in step 1121. After that, the base station returns to step 1109, and repeatedly performs the present procedure until the group vanishes.

In FIG. 11, the base station directly generates a codebook in step 1103. However, according to an exemplary embodiment of the present invention, the base station may use one of codebooks defined in advance. In this case, the base station generates a codebook for generating resource allocation information by selecting one codebook corresponding to an MCS set and a packet size range type of the group determined in step 1101 from a plurality of stored codebooks, and loading the selected codebook. However, when one codebook corresponding to the MCS set and the packet size range type of the group does not exist among the plurality of stored codebooks, the base station generates a codebook. In addition, according to an exemplary embodiment of the present invention, the terminal may provide the codebook generated in step 1103 to a terminal. In this case, the codebook generation information is replaced by codebook information in step 1119.

Figure 12:
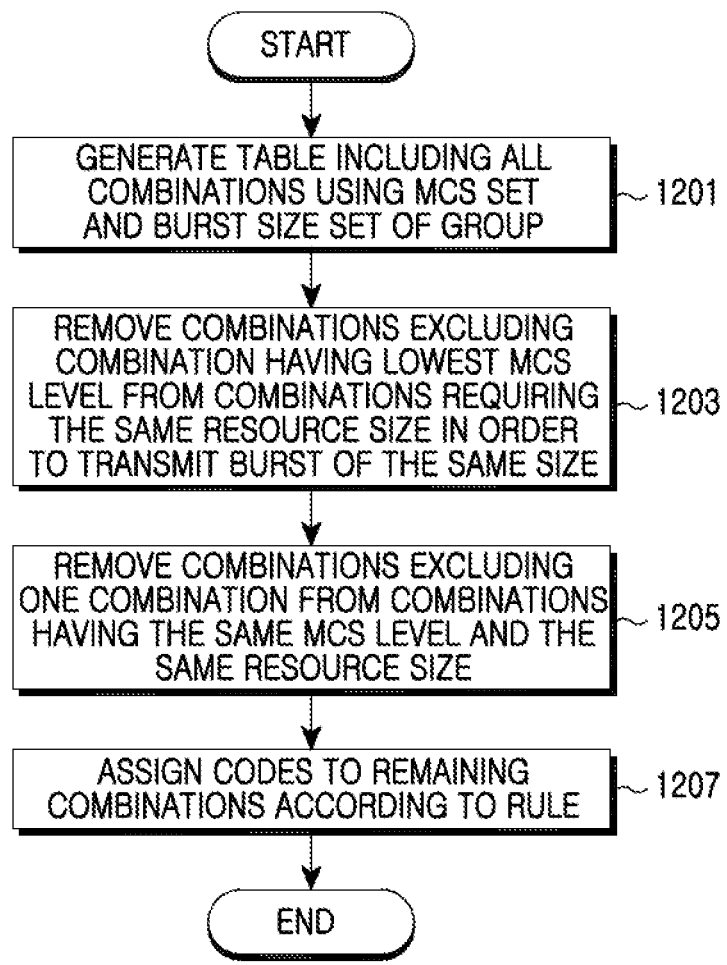
FIG. 12 is a flowchart illustrating a procedure of generating a codebook at a base station and a terminal in a broadband wireless communication system according to an exemplary embodiment of the present invention.

FIG. 12 is a flowchart illustrating a procedure of generating a codebook at a base station and a terminal in a broadband wireless communication system according to an exemplary embodiment of the present invention. The codebook generation procedure described with reference to FIG. 12 may be applied to the codebook generation step of FIGS. 8 to 11. In the description of FIG. 12, the base station and the terminal are referred to as 'codebook generators'.

Referring to FIG. 12, the codebook generator generates a table including all combinations using an MCS set and a burst size set of a group in step 1201. At this point, when the codebook generator is a base station, since the base station determines the MCS set and the burst size set of the group in itself, the base station can recognize the MCS set and the burst size set without a separate procedure. In contrast, when the codebook generator is a terminal, the terminal recognizes the MCS set and the burst size set via an MCS set identifier and a burst size identifier included in a group configuration message received from a base station. That is, the terminal uses an MCS set and a burst size set corresponding to the MCS set identifier and the burst size identifier of available MCS sets and burst size sets. At this point, the available MCS sets and burst size sets are determined in advance, or determined by the base station, and periodically known.

After generating the table including all the combinations, the codebook generator removes the rest of the combinations excluding a combination having a lowest MCS level from the combinations requiring the same resource size with respect to each burst size in step 1203. In other words, the codebook generator removes the rest of the combinations excluding a combination having a lowest MCS level from the combinations requiring the same resource size although different MCS levels are applied with respect to bursts of the same size.

That is, the codebook generator removes useless combinations where an MCS level difference does not have an influence on a resource size.

The codebook generator removes the rest of the combinations excluding a combination having a smallest burst size from the combinations requiring the same resource size with respect to each MCS level in step 1205. In other words, the codebook generator removes the rest of the combinations excluding a combination having a smallest burst size from the combinations requiring the same resource size although the same MCS level is applied with respect to bursts of different sizes. That is, the codebook generator removes useless combinations where a burst size difference does not have an influence on a resource size.

After removing the useless combinations, the codebook generator assigns codes to remaining respective effective combinations in step 1207. At this point, the codes are assigned according to a predefined rule. In addition, a length of the code may be determined as Ceil{log 2(the number of effective combinations)} optimized for the number of effective combinations, or as a value defined in advance.

In various exemplary embodiments of the present invention described with reference to FIGS. 7 to 12, a codebook generated by a base station and a terminal includes codes indicating combinations of MCS levels and resource sizes. At this point, a unit of the resource size is the number of RUs. Since the unit of the resource size is the number of RUs, types of resource sizes to be indicated reduces, so that a length of a code reduces. Simultaneously, a larger amount of resources than an amount of resources used for transmitting a burst may be allocated, so that zero padding is performed on a residual resource, and so waste of resources occurs.

Therefore, according to an exemplary embodiment of the present invention, to prevent the zero padding, a data tone instead of the number of RUs is used as a unit of the resource size. Here, the tone is a unit of resource formed of one subcarrier and one time symbol. In this case, a base station and a terminal configure all possible combinations using an MCS set and a burst size set of a group, and then assign codes to respective combinations. At this point, the codes are assigned according to a predefined rule. In addition, a length of the code may be determined as Ceil{$\log_2$(the number of combinations)} optimized for the number of possible combinations, or as a value defined in advance.

Using the codes generated as described above, a base station informs an MCS level and a burst size, and a terminal calculates a resource size used for transmitting the burst using the MCS level and the burst size. For example, the resource size is calculated by determining the number of data bits per tone for a relevant MCS level, dividing the burst size by the number of data bits per tone, and performing a raising operation.

That is, when allocating a group resource, the base station informs a start point of a resource region allocated for a relevant group, indicates terminals which are allocated resources via a user bitmap, and indicates an MCS level and a burst size of each terminal via a resource allocation bitmap. A resource allocation procedure of the base station and a resource determination procedure of the terminal are as follows.

Figure 13:
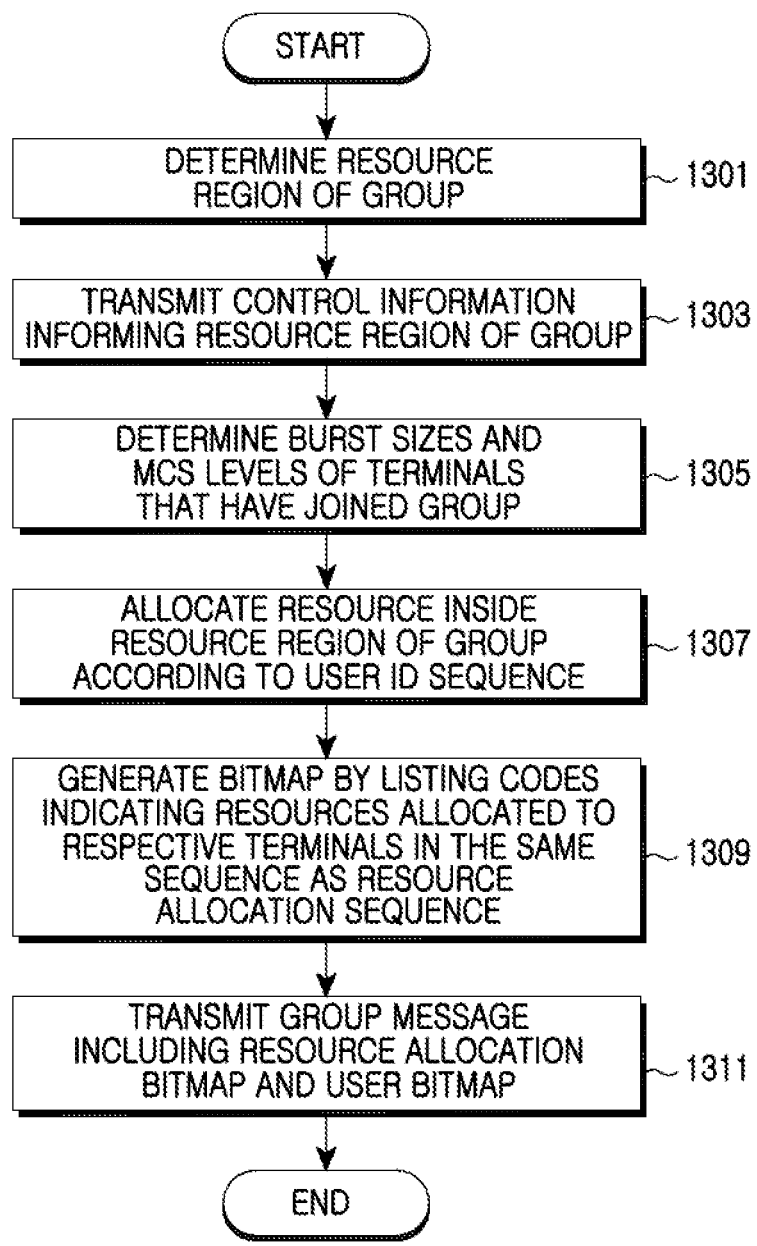
FIG. 13 is a flowchart illustrating a resource allocation procedure for a group of a base station in a broadband wireless communication system according to an exemplary embodiment of the present invention.

FIG. 13 is a flowchart illustrating a resource allocation procedure for a group of a base station in a broadband wireless communication system according to an exemplary embodiment of the present invention. An operation procedure of a base station in the case, where a unit of a resource size indicated via a code is a data tone, is illustrated.

Referring to FIG. 13, the base station determines a resource region of a group in step 1301. That is, a GRA scheme is performed in a limited portion of resources inside a subframe. Therefore, the base station determines a partial resource region to be used for the group among the resources inside the subframe.

After determining the resource region of the group, the base station transmits control information informing the resource region of the group in step 1303. Here, the control information includes information informing a start point of the resource region, and for example, is expressed in terms of an offset value in unit of an RU. At this point, the control information is transmitted to only terminals that have joined the group, or transmitted to all terminals. For example, in the case where the control information is transmitted to all terminals, the control information is transmitted via a broadcast message transmitted via a BCH such as a DCD/UCD, a superframe header, etc. In addition, in the case where the control information is transmitted to only terminals that have joined the group, the control information is transmitted via a group message including resource allocation information of the group.

The base station determines a burst size and an MCS level of each terminal that has joined the group in step 1305. Here, the burst size and the MCS level are determined with consideration of a channel quality, a data transmission rate, a service type, etc. of each terminal. At this point, the burst size and the MCS level are determined, so that a size of a resource for each terminal is calculated. Here, a unit of the resource size is a data tone.

After determining the burst size and the MCS level, the base station allocates a resource inside a resource region of the group according to a user ID sequence in step 1307. Here, the user ID is for identifying terminals that have joined the group inside the group, and performs a similar function to the bitmap index described with reference to FIGS. 8 to 12. In other words, the base station determines calculated sizes of resources for respective terminals by determining the burst size and the MCS level, and sequentially allocates resources by the sizes of the resources from a start point of the resource region according to the user ID sequence. At this point, since a calculation reference of the resource sizes is a burst size, a plurality of terminals may divide one RU, and may be allocated the divided RU.

After allocating the resources, the base station generates a resource allocation bitmap by listing codes indicating resources allocated to respective terminals according to the same sequence as the resource allocation sequence in step 1309. In addition, the base station generates a user bitmap indicating terminals that have been allocated resources.

The base station generates a group message including the resource allocation bitmap and the user bitmap, and transmits the group message in step 1311.

Figure 14:
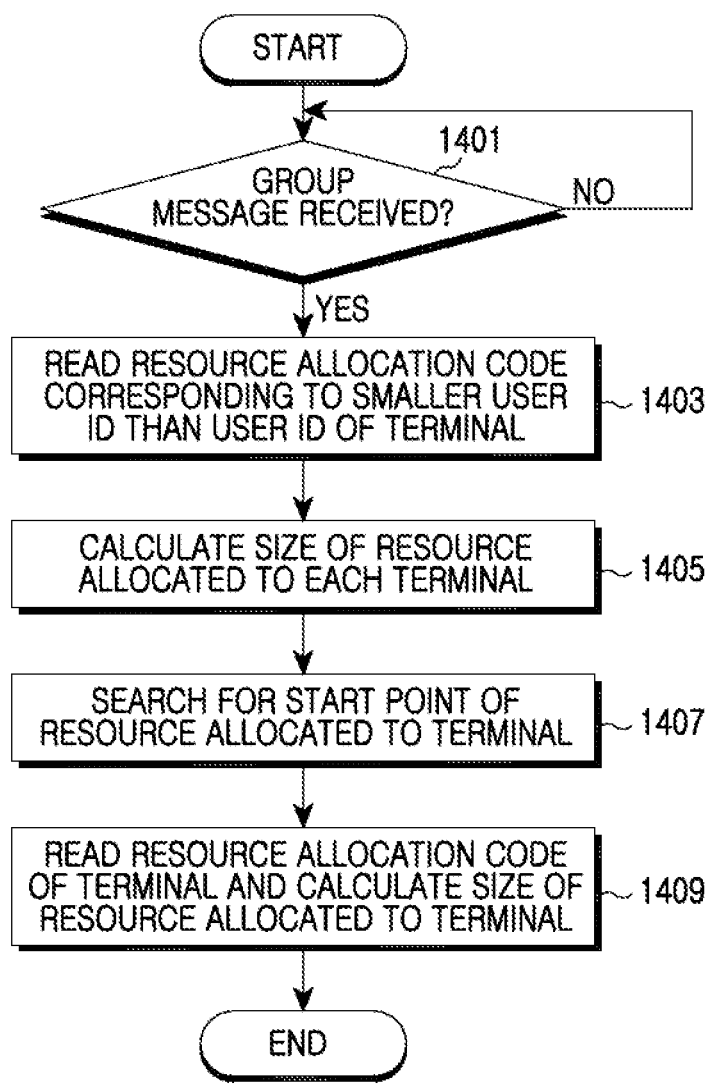
FIG. 14 is a flowchart illustrating a resource determination procedure of a terminal that has joined a group in a broadband wireless communication system according to an exemplary embodiment of the present invention.

FIG. 14 is a flowchart illustrating a resource determination procedure of a terminal that has joined a group in a broadband wireless communication system according to an exemplary embodiment of the present invention. An operation procedure of a terminal in the case, where a unit of a resource size indicated via a code is a data tone, is illustrated.

Referring to FIG. 14, the terminal determines whether a group message is received in step 1401. The group message is a message for group resource allocation, and includes a user bitmap indicating a terminal that has been allocated a resource inside the group, and a resource allocation bitmap representing an MCS level and a resource size of an allocated resource. In addition, the group message may include information indicating a resource region of the group.

If it is determined in step 1401 that the group message is received, the terminal reads resource allocation codes corresponding to a user ID smaller than a user ID of the terminal in step 1403. That is, since resources allocated to terminals having a smaller user ID than the user ID of the terminal are arranged prior to the resource allocated to the terminal, a location allocated to the terminal is determined depending on resource sizes of the resources allocated to the terminals having the smaller user ID. Therefore, the terminal determines MCS levels and burst sizes of the resources allocated to the terminals having the smaller user ID by reading codes located prior to codes corresponding to the terminal from the resource allocation bitmap.

The terminal calculates a resource size allocated to each terminal in step 1405. That is, the terminal calculates resource sizes of resources allocated to the terminals having the smaller user ID using the codes corresponding to the terminals having the smaller user ID read in step 1403. For example, the terminal calculates the resource size by determining the number of data bits per tone for a relevant MCS level with respect to the respective codes, dividing a relevant burst size by the number of data bits per tone, and performing a raising operation. At this point, a unit of the resource size is a data tone.

After calculating the resource size, the terminal searches for a start point of a resource allocated to the terminal in step 1407. That is, the terminal searches for the start point of the resource allocated to the terminal using a start point of a resource region of the group and resource sizes of resources allocated to terminals having the smaller user ID calculated in step 1405. In other words, the terminal determines the start point of the resource allocated to the terminal by accumulatively adding resource sizes of the resources allocated to the terminals having the smaller user ID to the start point of the resource region of the group. At this point, a unit of the start point of the resource allocated to the terminal is a data tone.

After searching for the start point of the resource allocated to the terminal, the terminal determines an MCS level and a burst size of the resource allocated to the terminal by reading a code corresponding to the terminal, and calculates the resource size allocated to the terminal using the MCS level and the burst size in step 1409. At this point, a unit of the start point of the resource allocated to the terminal is a data tone, and the start point of the resource occupies a region by the resource size from the start point found for in step 1407.

Figure 15:
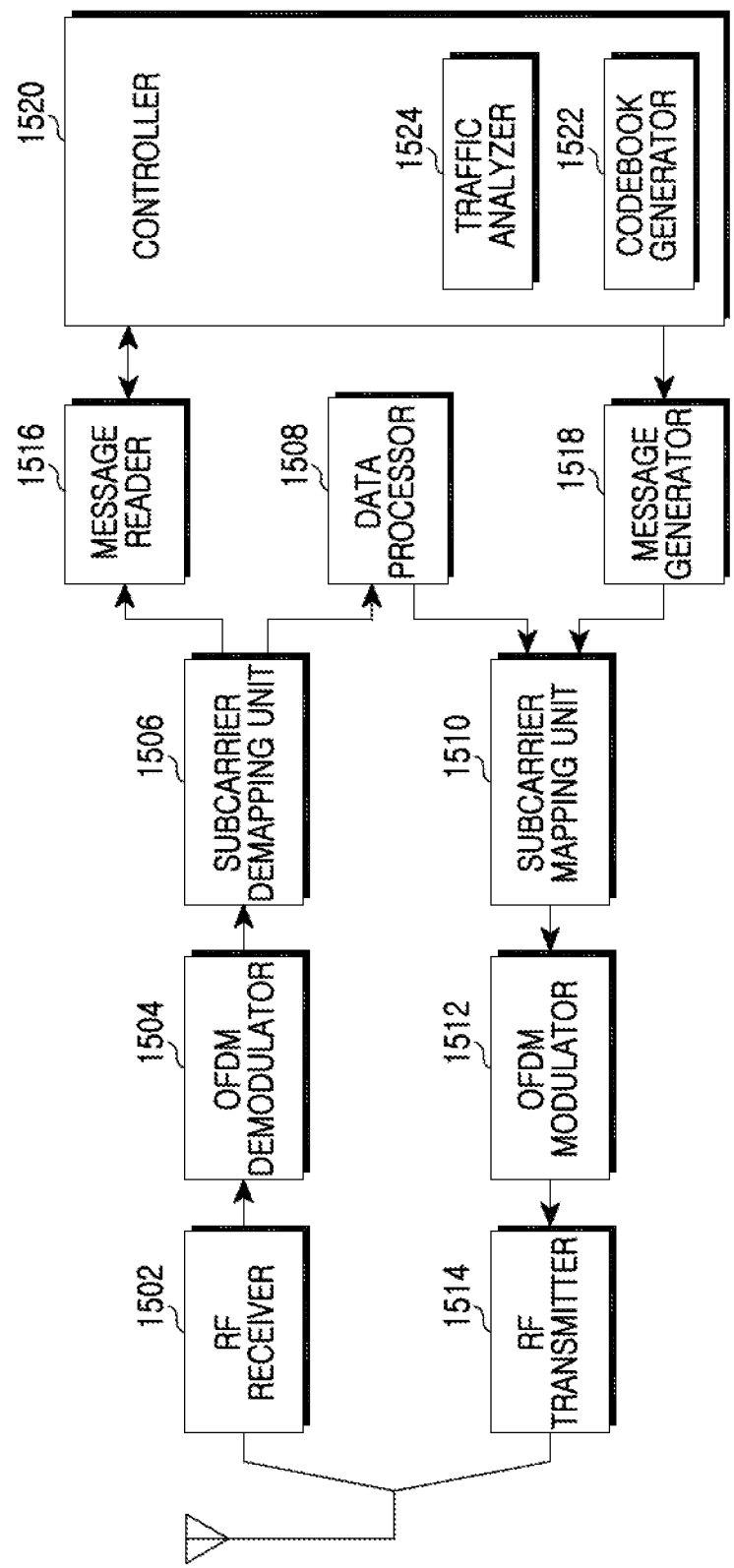
FIG. 15 is a block diagram illustrating a terminal in a broadband wireless communication system according to an exemplary embodiment of the present invention.

FIG. 15 is a block diagram illustrating a terminal in a broadband wireless communication system according to an exemplary embodiment of the present invention.

Referring to FIG. 15, the terminal includes a Radio Frequency (RF) receiver 1502, an OFDM demodulator 1504, a subcarrier demapping unit 1506, a data processor 1508, a subcarrier mapping unit 1510, an OFDM modulator 1512, an RF transmitter 1514, a message reader 1516, a message generator 1518, and a controller 1520.

The RF receiver 1502 converts an RF signal received via an antenna into a baseband signal. The OFDM demodulator 1504 divides the baseband signal on an OFDM symbol basis, removes a Cyclic Prefix (CP), and then recovers signals for each subcarrier by performing Fast Fourier Transform (FFT). The subcarrier demapping unit 1506 discriminates the signals for each subcarrier on a process basis. In addition, the subcarrier demapping unit 1506 provides data signals to the data processor 1508, and message signals to the message processor 1516. The data processor 1508 recovers a reception data bit line by demodulating and channel-decoding the data signals, and generates transmission data signals by channel-coding and modulating a transmission data bit line. The subcarrier mapping unit 1510 maps data signals provided from the data processor 1508, and message signals provided from the message generator 1518 to a subcarrier. The OFDM modulator 1512 converts the signals mapped to the subcarrier into signals in a time domain by performing an Inverse Fast Fourier Transform (IFFT), and generates OFDM symbols by inserting a CP. The RF transmitter 1514 up-converts the OFDM symbols into RF signals, and transmits the RF signals via the antenna.

The message reader 1516 recovers a message bit line from message signals received from a base station. In addition, the message reader 1516 determines information included in the message by reading the message bit line, and provides the determined information to the controller 1520.

More particularly, according to an exemplary embodiment of the present invention, the message reader 1516 reads messages for a negotiation procedure for determining MCS level candidates and packet size candidates. That is, the message reader 1516 determines MCS level candidates and packet size candidates determined by a base station using a negotiation indicate message, or determines that MCS level candidates and packet size candidates determined by the controller 1520 are accepted by a base station using a negotiation confirm message. In addition, the message reader 1516 determines an allocated resource by reading codebook-based resource allocation information according to a codebook provided from the controller 1520.

According to an exemplary embodiment of the present invention, the message reader 1516 determines group join indicate information, user bitmap allocation information, MCS level candidates of a group, and packet size candidates of a group via a group message received from the base station. In addition, the message reader 1516 determines whether a resource is allocated via a user bitmap included in the group message, and determines an allocated resource by reading a resource allocation bitmap included in the group message according to the codebook provided from the controller 1520.

According to an exemplary embodiment of the present invention, the message reader 1516 determines information of available MCS sets and packet range types via a broadcasting message. In addition, the message reader 1516 determines group join indicate information, user bitmap allocation information, an MCS set indicator of a group, and a packet range type indicator of a group via the group message. In addition, the message reader 1516 determines whether a resource is allocated via a user bitmap included in the group message, and determines an allocated resource by reading a resource allocation bitmap included in the group message according to the codebook provided from the controller 1520.

The message generator 1518 configures a message bit line including information provided from the controller 1520, and generates physical message signals from the message bit line. More particularly, according to an exemplary embodiment of the present invention, the message generator 1518 generates messages for a negotiation procedure for determining MCS level candidates and packet size candidates. That is, the message generator 1518 generates a negotiation confirm message for accepting MCS level candidates and packet size candidates determined by a base station, or generates a negotiation indicate message informing the base station of MCS level candidates and packet size candidates determined by the controller 1520.

The controller 1520 controls overall functions of the terminal. For example, the controller 1520 controls the subcarrier demapping unit 1506 to extract data signals from a resource determined by the message reader 1516, and controls the subcarrier mapping unit 1510 to transmit data signals to the allocated resource. In addition, the controller 1520 performs a process corresponding to information determined by the message reader 1516, and provides information included in a transmission message to the message generator 1518. More particularly, a codebook generator 1522 inside the controller 1520 generates a codebook for reading resource allocation information. In addition, a traffic analyzer 1524 inside the controller 1520 analyzes a traffic characteristic, that is, a range of an occurring packet size, available MCS levels, etc.

In operation, the controller 1520 performs a negotiation procedure for determining MCS level candidates and packet size candidates. For this purpose, the controller 1520 controls the message generator 1518 to generate at least one of a negotiation indicate message and a negotiation confirm message. When generating the negotiation indicate message, the controller 1520 determines packet size candidates and MCS level candidates with consideration of the range of the occurring packet size and the available MCS level analyzed by the traffic analyzer 1524, and informs the message generator 1518 of the determined packet size candidates and MCS level candidates. At this point, depending on the intention of an operator of the exemplary embodiment of the present invention, transmission/reception of the negotiation confirm message may be omitted. In addition, the codebook generator 1522 generates a codebook according to the MCS level candidates and the packet size candidates. In more detail, the codebook generator 1522 calculates the number of transmittable data bits per RU, resource sizes for each MCS level, the number of codes to be included in the codebook, and a code length using Equations (1) to (4), and then assigns codes to combinations of MCS levels and resource sizes. When the codebook is generated, the controller 1520 provides the codebook to the message reader 1516.

According to an exemplary embodiment of the present invention, the controller 1520 determines whether a group join is indicated depending on group join indicate information inside a group message provided from the message reader 1516. When it is determined that the group join is indicated, the codebook generator 1522 generates a codebook according to codebook generation information provided from the message reader 1516, that is, supportable MCS level candidates and packet size candidates of the group. In more detail, the codebook generator 1522 calculates the number of transmittable data bits per RU, resource sizes for each MCS level, the number of codes to be included in the codebook, and a code length using Equations (1) to (4), and then assigns codes to combinations of MCS levels and resource sizes. At this point, in the case where an offset value is applied to the terminal, the codebook generator 1522 collectively adds the offset value to the packet size candidates, and then calculates the resource sizes. When the codebook is generated, the controller 1520 provides the codebook to the message reader 1516.

According to an exemplary embodiment of the present invention, the controller 1520 determines whether a group join is indicated depending on group join indicate information inside a group message provided from the message reader 1516. When it is determined that the group join is indicated, the codebook generator 1522 generates a codebook according to codebook generation information provided from the message reader 1516, that is, an MCS set indicator and a packet range type indicator of the group. In more detail, the codebook generator 1522 determines MCS level candidates corresponding to the MCS set indicator of the group and packet size candidates corresponding to the packet range type indicator of the group using information of MCS sets and packet range types received via the broadcasting message. In addition, the codebook generator 1522 calculates the number of transmittable data bits per RU, resource sizes for each MCS level, the number of codes to be included in the codebook, and a code length using Equations (1) to (4), and then assigns codes to combinations of MCS levels and resource sizes. At this point, in the case where an offset value is applied to the terminal, the codebook generator 1522 collectively adds the offset value to the packet size candidates, and then calculates the resource sizes. When the codebook is generated, the controller 1520 provides the codebook to the message reader 1516.

According to the above-described two exemplary embodiments of the present invention, an operation of the codebook generator 1522 may be replaced as follows. The codebook generator 1522 generates a table including all combinations using an MCS set and a burst size set of a group. After generating the table including all the combinations, the codebook generator 1522 removes the rest of the combinations excluding a combination having a lowest MCS level from the combinations requiring the same resource size with respect to each burst size, and removes the rest of the combinations excluding a combination having a smallest burst size from the combinations requiring the same resource size with respect to each MCS level. That is, the codebook generator 1522 removes useless combinations. After removing the useless combinations, the codebook generator 1522 assigns codes to remaining respective combinations. At this point, the codes are assigned according to a predefined rule. In addition, a length of the code may be determined as Ceil$\{\log_2(\text{the number of effective combinations})\}$ optimized for the number of effective combinations, or as a value defined in advance.

According to the construction of FIG. 15, the controller 1520 provides the codebook generated by the codebook generator 1522 to the message reader 1516. However, according to an exemplary embodiment of the present invention, the controller 1520 may use one of codebooks defined in advance. In this case, a codebook storing unit (not shown) for storing the codebooks defined in advance is additionally provided. Accordingly, the controller 1520 generates a codebook for generating resource allocation information by selecting one codebook corresponding to MCS level candidates and packet size candidates determined by the controller 1520, or corresponding to an MCS set and a packet size range type from a plurality of codebooks defined in advance stored in the codebook storing unit, and loading the selected codebook. However, when one codebook corresponding to the MCS set and the packet size range type of the group does not exist among the plurality of stored codebooks, the codebook generator 1522 generates a codebook.

Figure 16:
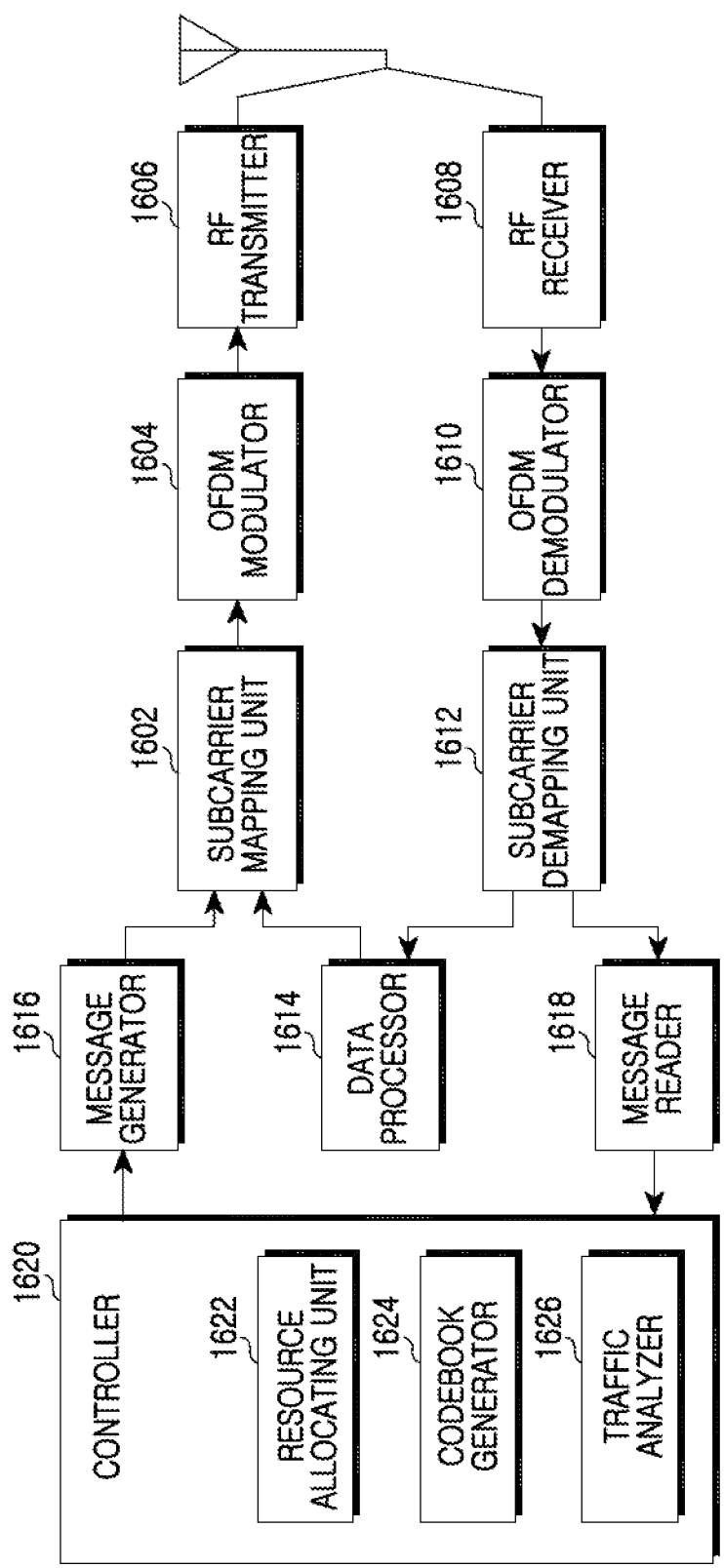
FIG. 16 is a block diagram illustrating a base station in a broadband wireless communication system according to an exemplary embodiment of the present invention.

FIG. 16 is a block diagram illustrating a base station in a broadband wireless communication system according to an exemplary embodiment of the present invention.

Referring to FIG. 16, the base station includes a subcarrier mapping unit 1602, an OFDM modulator 1604, an RF transmitter 1606, an RF receiver 1608, an OFDM demodulator 1610, a subcarrier demapping unit 1612, a data processor 1614, a message generator 1616, a message reader 1618, and a controller 1620.

The subcarrier mapping unit 1602 maps data signals provided from the data processor 1614 and message signals provided from the message generator 1618 to a subcarrier. The OFDM modulator 1604 converts the signals mapped to the subcarrier into signals in the time domain by performing the IFFT, and generates OFDM symbols by inserting a CP. The RF transmitter 1608 up-converts the OFDM symbols into RF signals, and then transmits the RF signals via an antenna.

The RF receiver 1610 converts an RF signal received via the antenna into a baseband signal. The OFDM demodulator 1612 divides the baseband signal on an OFDM symbol basis, removes a CP, and then recovers signals for each subcarrier by performing the FFT. The subcarrier demapping unit 1612 discriminates the signals for each subcarrier on a process basis. In addition, the subcarrier demapping unit 1612 provides data signals to the data processor 1614, and message signals to the message processor 1616. The data processor 1614 recovers a reception data bit line by demodulating and channel-decoding the data signals, and generates transmission data signals by channel-coding and modulating a transmission data bit line.

The message reader 1618 recovers a message bit line from message signals received from a terminal. In addition, the message reader 1618 determines information included in the message by reading the message bit line, and provides the determined information to the controller 1620. More particularly, according to an exemplary embodiment of the present invention, the message reader 1618 reads messages for a negotiation procedure for determining MCS level candidates and packet size candidates. That is, the message reader 1618 determines MCS level candidates and packet size candidates determined by a terminal using a negotiation indicate message, or determines whether that MCS level candidates and packet size candidates determined by the base station are accepted by the terminal using a negotiation confirm message.

The message generator 1616 configures a message bit line including information provided from the controller 1620, and generates physical message signals from the message bit line.

More particularly, according to an exemplary embodiment of the present invention, the message generator 1616 generates messages for a negotiation procedure for determining MCS level candidates and packet size candidates. That is, the message generator 1616 generates a negotiation confirm message for accepting MCS level candidates and packet size candidates determined by a terminal, or generates a negotiation indicate message informing MCS level candidates and packet size candidates provided from the controller 1620. In addition, the message generator 1516 generates resource allocation information formed of codes inside a codebook provided from the controller 1620 depending on resource allocation results provided from the controller 1620.

According to an exemplary embodiment of the present invention, the message generator 1616 generates a user bitmap indicating a terminal that is allocated a resource inside a group depending on the resource allocation results provided from the controller 1620, and generates a resource allocation bitmap formed of codes inside a group codebook provided from the controller 1620. In addition, the message generator 1616 generates a group message including group join indicate information, user bitmap allocation information, MCS level candidates of the group, packet size candidates of the group, the user bitmap, and the resource allocation bitmap.

According to an exemplary embodiment of the present invention, the message generator 1616 generates a broadcasting message including information of MCS sets and packet range types defined in advance. In addition, the message generator 1616 generates a user bitmap indicating a terminal that is allocated a resource inside the group depending on resource allocation results provided from the controller 1620, and generates a resource allocation bitmap formed of codes inside the group codebook provided from the controller 1620. In addition, the message generator 1616 generates a group message including group join indicate information, user bitmap allocation information, an MCS set indicator of the group, a packet range type indicator of the group, the user bitmap, and the resource allocation bitmap.

The controller 1620 controls overall functions of the base station. For example, the controller 1620 controls the subcarrier demapping unit 1612 to extract data signals for each terminal depending on resource allocation results, and controls the subcarrier mapping unit 1602 to map data signals for each terminal depending on the resource allocation results. In addition, the controller 1620 performs a process corresponding to information determined by the message reader 1618, and provides information included in a transmission message to the message generator 1616. In addition, a resource allocating unit inside the controller 1620 allocates a resource according to an individual resource allocation scheme or a GRA scheme. More particularly, a codebook generator 1624 inside the controller 1620 generates a codebook for reading resource allocation information. In addition, a traffic analyzer 1626 inside the controller 1620 analyzes a traffic characteristic, that is, a type of a service in progress, a size distribution of occurring packets, a distribution of available MCS levels, etc.

According to an exemplary embodiment of the present invention, the controller 1620 performs a negotiation procedure for determining MCS level candidates and packet size candidates. For this purpose, the controller 1620 controls the message generator 1616 to generate at least one of a negotiation indicate message and a negotiation confirm message. When generating the negotiation indicate message, the controller 1620 determines packet size candidates and MCS level candidates with consideration of an occurring traffic characteristic analyzed by the traffic analyzer 1626, and informs the message generator 1616 of the determined packet size candidates and MCS level candidates. At this point, depending on the intention of an operator of the exemplary embodiment of the present invention, transmission/reception of the negotiation confirm message may be omitted. In addition, the codebook generator 1624 generates a codebook according to the MCS level candidates and the packet size candidates. In more detail, the codebook generator 1624 calculates the number of transmittable data bits per RU, resource sizes for each MCS level, the number of codes to be included in the codebook, and a code length using Equations (1) to (4), and then assigns codes to combinations of MCS levels and resource sizes. When the codebook is generated, the controller 1620 provides the codebook to the message generator 1618. In addition, when a resource allocation period arrives, a resource allocating unit 1622 allocates resources to terminals, and the controller 1620 provides resource allocation results to the message generator 1616.

According to an exemplary embodiment of the present invention, the controller 1620 generates a group according to a traffic characteristic analyzed by the traffic analyzer 1626, and determines MCS level candidates and packet size candidates for a group codebook. Accordingly, the codebook generator 1624 generates a group codebook. In more detail, the codebook generator 1624 calculates the number of transmittable data bits per RU, resource sizes for each MCS level, the number of codes to be included in the codebook, and a code length using Equations (1) to (4), and then assigns codes to combinations of MCS levels and resource sizes. When the group codebook is generated, the controller 1620 provides the codebook to the message generator 1616. In addition, when a terminal that is to join the group is selected, the resource allocating unit 1622 provides information used for generating group join indicate information, that is, the user bitmap index allocation result and information of the terminal to the message generator 1616, and provides MCS level candidates of the group and packet size candidates of the group to the message generator 1616. In addition, when a resource allocation period arrives, the resource allocating unit 1622 allocates resources to terminals, and the controller 1620 provides resource allocation results of the resource allocating unit 1622 to the message generator 1616.

According to an exemplary embodiment of the present invention, the controller 1620 generates a group according to a traffic characteristic analyzed by the traffic analyzer 1626, and selects an MCS set and a packet range type for a group codebook from MCS sets and packet range types defined in advance. Accordingly, the codebook generator 1624 generates a group codebook. In more detail, the codebook generator 1624 calculates the number of transmittable data bits per RU, resource sizes for each MCS level, the number of codes to be included in the codebook, and a code length using Equations (1) to (4), and then assigns codes to combinations of MCS levels and resource sizes. When the group codebook is generated, the controller 1620 provides the codebook to the message generator 1616. In addition, when a terminal that is to join the group is selected, the resource allocating unit 1622 allocates a user bitmap index to the terminal. Accordingly, the controller 1620 provides information for generating group join indicate information, that is, the user bitmap index allocation result and information of the terminal to the message generator 1616, and provides MCS level candidates of the group and packet size candidates of the group to the message generator 1616. In addition, a resource allocation period arrives, the resource allocating unit 1622 allocates resources to terminals, and the controller 1620 provides resource allocation results of the resource allocating unit 1622 to the message generator 1616. In addition, when a transmission period of a broadcasting message arrives, the controller 1616 provides information of MCS sets and packet range types defined in advance to the message generator 1616.

According to the above-described two exemplary embodiments of the present invention, an operation of the codebook generator 1624 may be replaced as follows. The codebook generator 1624 generates a table including all combinations using an MCS set and a burst size set of a group. After generating the table including all the combinations, the codebook generator 1624 removes the rest of the combinations excluding a combination having a lowest MCS level from the combinations requiring the same resource size with respect to each burst size, and removes the rest of the combinations excluding a combination having a smallest burst size from the combinations requiring the same resource size with respect to each MCS level. That is, the codebook generator 1624 removes useless combinations. After removing the useless combinations, the codebook generator 1624 assigns codes to remaining respective effective combinations. At this point, the codes are assigned according to a predefined rule. In addition, a length of the code may be determined as Ceil{$\log_2$ (the number of effective combinations)} optimized for the number of effective combinations, or as a value defined in advance.

According to an exemplary embodiment of the present invention, the controller 1620 controls to determine a resource region of the group, and transmit control information informing the resource region of the group. Here, the control information includes information informing a start point of the resource region, and is transmitted via a broadcast message transmitted via a BCH such as a DCD/UCD, a superframe header, etc., or transmitted via a group message including resource allocation information of the group. After that, the resource allocating unit 1622 determines a burst size and an MCS level of each terminal that has joined the group. Here, the burst size and the MCS level are determined with consideration of channel quality, a data transmission rate, and a service type of each terminal. After determining the burst size and the MCS level, the resource allocating unit 1622 allocates resources inside the resource region of the group according to a user ID sequence. At this point, since a calculation reference of the resource sizes is a burst size, a plurality of terminals may divide one RU, and may be allocated the divided RU. In addition, the controller 1620 provides resource allocation results of the resource allocating unit 1622 to the message generator 1616.

Referring to FIG. 16, the controller 1620 provides a codebook generated by the codebook generator 1624 to the message generator 1616. However, according to an exemplary embodiment of the present invention, the base station may use one of codebooks defined in advance. In this case, a codebook storing unit (not shown) for storing the codebooks defined in advance is additionally provided. Accordingly, the controller 1620 generates a codebook for generating resource allocation information by selecting one codebook corresponding to MCS level candidates and packet size candidates determined by the controller 1620, or corresponding to an MCS set and a packet size range type of the group from the plurality of codebooks stored in the codebook storing unit, and loading the selected codebook. However, when one codebook corresponding to the MCS set and the packet size range type of the group does not exist among the plurality of stored codebooks, the codebook generator 1624 generates a codebook.

Resource allocation information generated based on a codebook indicating a limited range of MCS levels and resource sizes is used in a broadband wireless communication system, so that an overhead due to the resource allocation information can be minimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a broadband wireless communication system, the method comprising:
receiving a group configuration message informing of a burst size set supported in a user group for a group resource allocation, which is to allocate resources to multiple users as a group;
determining the burst size set supported in the user group based on the group configuration message;
allocating, by a Base Station (BS), a resource to at least one terminal that has joined a group within a range of burst sizes included in the codebook;
searching for at least one code corresponding to at least one allocated burst size;
generating the resource allocation information comprising the found at least one code;
generating a codebook for the group resource allocation using the burst size set; and
receiving a group resource allocation message comprising resource allocation information generated based on the codebook,
wherein the burst size set comprises a plurality of burst sizes,
wherein each code of the codebook respectively indicates each burst size of the burst size set, and
wherein the searching for the at least one code comprises, if a terminal to which an offset value is applied exists among terminals that have joined the group, searching for a code according to a correspondence relation between a separate code and a burst size depending on the offset value with respect to the terminal to which the offset value is applied.

2. The method of claim 1, wherein the generating of the codebook comprises loading a codebook corresponding to the burst size set from a plurality of codebooks defined in advance.

3. The method of claim 1, further comprising:
searching for a code included in the resource allocation information inside the codebook; and
determining a burst size allocated to the terminal corresponding to the found code.

4. The method of claim 1, wherein the determining of the burst size set comprises:
determining a burst size set identifier included in the group configuration message received from a base station; and
determining the burst size set corresponding to the burst size set identifier among burst size sets defined in advance.

5. The method of claim 1, wherein the determining of the burst size set comprises:
obtaining information of burst size sets via a broadcasting message received from a base station;
determining a burst size set identifier of the group included in the group configuration message received from the base station; and
determining the burst size set corresponding to the burst size set identifier among the burst size sets obtained via the broadcasting message.

6. The method of claim 5, further comprising:
extracting a code corresponding to the terminal from a resource allocation bitmap included in the group resource allocation message;
searching for the code inside the codebook; and
determining a burst size corresponding to the found code.

7. An apparatus for operating a terminal in a broadband wireless communication system, the apparatus comprising:
a receiver for receiving a group configuration message informing of a burst size set supported in a user group for a group resource allocation, which is to allocate resources to multiple users as a group; and
a controller for determining the burst size set supported in the user group based on the group configuration message, for searching for at least one code corresponding to at least one allocated burst size, for generating the resource allocation information comprising the found at least one code, and for generating a codebook for the group resource allocation using the burst size set,
wherein a Base Station (BS) allocates a resource to at least one terminal that has joined a group within a range of burst sizes included in the codebook,
wherein the receiver receives a group resource allocation message comprising resource allocation information generated based on the codebook,
wherein the burst size set comprises a plurality of burst sizes,
wherein each code of the codebook respectively indicates each burst size of the burst size set, and
wherein the searching for the at least one code comprises, if a terminal to which an offset value is applied exists among terminals that have joined the group, searching for a code according to a correspondence relation between a separate code and a burst size depending on the offset value with respect to the terminal to which the offset value is applied.

8. The apparatus of claim 7, wherein the controller loads a codebook corresponding to the burst size set of a plurality of codebooks defined in advance.

9. The apparatus of claim 7, wherein the controller searches for a code included in the resource allocation information inside the codebook, and determines a burst size allocated to the terminal corresponding to the found code.

10. The apparatus of claim 7, wherein the controller determines a burst size set identifier included in the group configuration message received from a base station, and determines the burst size set corresponding to the burst size set identifier among burst size sets defined in advance.

11. The apparatus of claim 7, wherein the controller obtains information of burst size sets via a broadcasting message received from a base station, determines a burst size set identifier of the group included in the group configuration message received from the base station, and determines the burst size set corresponding to the burst size set identifier among the burst size sets obtained via the broadcasting message.

12. The apparatus of claim 11, wherein the controller extracts a code corresponding to the terminal from a resource allocation bitmap included in the group resource allocation message, searches for the code inside the codebook, and determines a burst size corresponding to the found code.

13. A method for operating a base station in a broadband wireless communication system, the method comprising:
    determining a burst size set supported in a user group for a group resource allocation, which is to allocate resources to multiple users as a group;
    allocating a resource to at least one terminal that has joined a group within a range of burst sizes included in the codebook;
    searching for at least one code corresponding to at least one allocated burst size;
    generating the resource allocation information comprising the found at least one code;
    generating a codebook for the group resource allocation using the burst size set;
    transmitting a group configuration message informing of the burst size set supported in the user group; and
    transmitting a group resource allocation message comprising resource allocation information generated based on the codebook,
    wherein the burst size set comprises a plurality of burst sizes,
    wherein each code of the codebook respectively indicates each burst size of the burst size set, and
    wherein the searching for the at least one code comprises, if a terminal to which an offset value is applied exists among terminals that have joined the group, searching for a code according to a correspondence relation between a separate code and a burst size depending on the offset value with respect to the terminal to which the offset value is applied.

14. The method of claim 13, wherein the group resource allocation message comprises at least one of a resource allocation bitmap, a user bitmap, group join indicate information, a burst size set of a group, and a burst size set identifier of a group.

15. The method of claim 14, wherein the allocating of the resource within the range of burst sizes included in the codebook comprises, if a terminal to which an offset value is applied exists among terminals that have joined the group, allocating a resource within a burst size range calculated from a burst size range to which the offset value has been added with respect to the terminal to which the offset value is applied.

16. The method of claim 13, wherein the generating of the codebook comprises loading a codebook corresponding to the burst size set from a plurality of codebooks defined in advance.

17. An apparatus for a base station in a broadband wireless communication system, the apparatus comprising:
    a controller for determining a burst size set supported in a user group for a group resource allocation, which is to allocate resources to multiple users as a group, and for generating a codebook for the group resource allocation using the burst size set; and
    a transmitter for transmitting a group configuration message informing of the burst size set supported in the user group, and for transmitting a group resource allocation message comprising resource allocation information generated based on the codebook,
    wherein the controller allocates a resource to at least one terminal that has joined a group within a range of burst sizes included in the codebook, searches for at least one code corresponding to at least one allocated burst size, and generates the resource allocation information comprising the found at least one code,
    wherein the burst size set comprises a plurality of burst sizes,
    wherein each code of the codebook respectively indicates each burst size of the burst size set, and
    wherein, if a terminal to which an offset value is applied exists among terminals that have joined the group, the controller searches for a code according to a correspondence relation between a separate code and a burst size depending on the offset value with respect to the terminal to which the offset value is applied.

18. The apparatus of claim 17, wherein the group resource allocation message comprises at least one of a resource allocation bitmap, a user bitmap, group join indicate information, a burst size set of a group, and a burst size set identifier of a group.

19. The apparatus of claim 18, wherein, if a terminal to which an offset value is applied exists among terminals that have joined the group, the controller allocates a resource within a burst size range calculated from a burst size range to which the offset value has been added with respect to the terminal to which the offset value is applied.

20. The apparatus of claim 17, wherein the controller, to generate the codebook, loads a codebook corresponding to the burst size set from a plurality of codebooks defined in advance.

* * * * *